(12) United States Patent
Kusumura et al.

(10) Patent No.: US 11,188,946 B2
(45) Date of Patent: Nov. 30, 2021

(54) COMMERCIAL MESSAGE PLANNING ASSISTANCE SYSTEM AND SALES PREDICTION ASSISTANCE SYSTEM

(71) Applicant: NEC Corporation, Tokyo (JP)

(72) Inventors: Yukitaka Kusumura, Tokyo (JP); Hironori Mizuguchi, Tokyo (JP); Ryohei Fujimaki, Tokyo (JP); Satoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1351 days.

(21) Appl. No.: 15/326,273

(22) PCT Filed: Jun. 26, 2015

(86) PCT No.: PCT/JP2015/003221
§ 371 (c)(1),
(2) Date: Jan. 13, 2017

(87) PCT Pub. No.: WO2016/009599
PCT Pub. Date: Jan. 21, 2016

(65) Prior Publication Data
US 2017/0206560 A1 Jul. 20, 2017

Related U.S. Application Data

(60) Provisional application No. 62/024,121, filed on Jul. 14, 2014.

(51) Int. Cl.
*G06Q 30/02* (2012.01)
(52) U.S. Cl.
CPC ......... *G06Q 30/0264* (2013.01); *G06Q 30/02* (2013.01); *G06Q 30/0202* (2013.01); *G06Q 30/0242* (2013.01)

(58) Field of Classification Search
CPC ............... G06Q 30/0264; G06Q 30/0202
See application file for complete search history.

(56) References Cited

U.S. PATENT DOCUMENTS

| 7,769,626 B2 * | 8/2010 | Reynolds | G06Q 30/0203 705/7.32 |
| 8,112,302 B1 * | 2/2012 | Trovero | G06Q 10/063 705/7.31 |

(Continued)

FOREIGN PATENT DOCUMENTS

| JP | 05-113986 A | 5/1993 |
| JP | 2007-018216 A | 1/2007 |

(Continued)

OTHER PUBLICATIONS

Sebastien Thomassey et al, A hybrid sales forecasting system based on clustering and decision trees, Decision Support Systems 42 (2006) 408-421 (Year: 2005).*

(Continued)

*Primary Examiner* — Andre D Boyce
(74) *Attorney, Agent, or Firm* — Sughrue Mion, PLLC

(57) ABSTRACT

A prediction data input unit 91 inputs prediction data that is one or more explanatory variables that are information likely to affect future sales. An exposure pattern generation unit 92 generates an exposure pattern which is an explanatory variable indicating the content of a commercial message scheduled to be performed during a period from predicted time to future prediction target time. A component determination unit 93 determines the component used for predicting the sales, on the basis of a hierarchical latent structure that is a structure in which latent variables are represented by a tree structure and components representing probability models are located at nodes of a lowest level of the tree structure, gating functions for determining a branch direction in the nodes of the hierarchical latent structure, and the prediction (Continued)

data and the exposure pattern. A sales prediction unit 94 predicts the sales on the basis of the component determined by the component determination unit 93 and of the prediction data and the exposure pattern.

10 Claims, 21 Drawing Sheets

(56) References Cited

U.S. PATENT DOCUMENTS

| | | | | |
|---|---|---|---|---|
| 8,818,838 | B1* | 8/2014 | Sharma | G06Q 30/0202 705/7.29 |
| 9,047,559 | B2* | 6/2015 | Brzezicki | G16B 40/00 703/2 |
| 2005/0039206 | A1* | 2/2005 | Opdycke | G06Q 30/0277 725/35 |
| 2006/0184473 | A1* | 8/2006 | Eder | G06N 5/022 706/20 |
| 2008/0140688 | A1* | 6/2008 | Clayton | G06Q 10/0637 |
| 2009/0018996 | A1* | 1/2009 | Hunt | G06F 16/2264 |
| 2009/0254971 | A1* | 10/2009 | Herz | G06Q 30/0603 726/1 |
| 2011/0258049 | A1* | 10/2011 | Ramer | G06Q 30/0273 705/14.66 |
| 2013/0325782 | A1 | 12/2013 | Fujimaki et al. | |
| 2015/0111591 | A1* | 4/2015 | Hoffberg | G06Q 10/0635 455/452.1 |
| 2016/0196587 | A1* | 7/2016 | Eder | G06Q 30/0276 705/14.49 |

FOREIGN PATENT DOCUMENTS

| | | |
|---|---|---|
| JP | 2013-012168 A | 1/2013 |
| WO | 2013/179579 A1 | 12/2013 |

OTHER PUBLICATIONS

I-Fei Chen et al, Sales forecasting by combining clustering and machine-learning techniques for computer retailing, Neural Comput & Applic (2017) 28:2633-2647 (Year: 2016).*

Vicki G. Morwitz et al, Using Segmentation to Improve Sales Forecasts Based on Purchase Intent: Which "Intenders" Actually Buy?, Journal of Marketing Research vol. XXIX (Nov. 1992), 391-405 (Year: 1992).*

Ryohei Fujimaki et al., "Factorized Asymptotic Bayesian Inference for Mixture Modeling," Proceedings of the fifteenth international conference on Artificial Intelligence and Statistics (AISTATS), Mar. 2012, pp. 400-408.

International Search Report of PCT/JP2015/003221 dated Sep. 8, 2015.

\* cited by examiner

FIG. 2

| PRODUCT ID | PRODUCT NAME | PRODUCT CATEGORY | PRODUCT CLASSIFICATION | SALES START DATE | SET PRICE | ... |
|---|---|---|---|---|---|---|
| IE001 | ○○ RAMEN | FOOD | RAMEN | 2008/9/21 | ¥200.- | |
| ID010 | ▲▲ RAMEN | FOOD | COFFEE | 2014/6/19 | ¥130.- | |

(A) PRODUCT TABLE

| DATE AND TIME | AREA | TEMPERATURE | THE DAY'S MAXIMUM TEMPERATURE | THE DAY'S MINIMUM TEMPERATURE | PRECIPITATION | WEATHER | HUMIDITY | ... |
|---|---|---|---|---|---|---|---|---|
| 20130513 01:00 | EAST AREA OF CHUO WARD | 17.5 | 24.5 | 15.6 | 0 | CLOUDY | 45.3 | |
| 20130513 04:00 | NORTH AREA OF CHIYODA WARD | 16.2 | 24.5 | 15.6 | 13 | RAINY | 78.8 | |

(B) METEOROLOGICAL TABLE

| PRODUCT ID | NUMBER OF SOLD COMMODITIES | SALES AMOUNT | ... |
|---|---|---|---|
| IE001 | 120 | 24000 | |
| ID011 | 100 | 13000 | |

(C) SALES TABLE

| PRODUCT ID | CLASSIFICATION | SMALL CLASSIFICATION | FINE CLASSIFICATION | TRANSMITTED CONTENT | VALUE | ... |
|---|---|---|---|---|---|---|
| IE001 | TARGET KEYWORD | ENTIRE AIR TIME | | IDOL A | TEN MIN | |
| IE001 | BY CATEGORY | SHOW | ANIMATION | IDOL A | ONE MIN | |

(D) ADVERTISING MEDIUM METADATA TABLE

| TYPICAL RAMEN |
|---|
| TASTY - ADJECTIVE |
| EAT - VERB |
| ARTISAN - NOUN |

| CM REPUTATION |
|---|
| CUTE - ADJECTIVE |
| IDOL A - NOUN |
| FRESH - ADJECTIVE |

...

(E) SOCIAL MEDIA TRANSMITTED INFORMATION

COMMERCIAL MESSAGE PLANNING ASSISTANCE SYSTEM AND SALES PREDICTION ASSISTANCE SYSTEM

CROSS REFERENCE TO RELATED APPLICATIONS

This application is a National Stage of International Application No. PCT/JP2015/003221 filed Jun. 26, 2015, claiming priority based on U.S. Provisional Patent Application No. 62/024,121 filed Jul. 14, 2014, the contents of all of which are incorporated herein by reference in their entirety.

TECHNICAL FIELD

The present invention relates to a commercial message planning assistance system, a commercial message planning assistance method, and a commercial message planning assistance program for predicting sales based on commercial message planning, and to a sales prediction assistance system, a sales prediction assistance method, and a sales prediction assistance program for predicting sales based on commercial message planning.

BACKGROUND ART

In order to increase product sales, various marketing activities are carried out. Particularly, along with the development of information and media in recent years, it is known that advertising and word of mouth presented through various information and media also significantly affect the product sales. Therefore, to predict the product sales, it is necessary to analyze various factors affecting the sales appropriately.

For example, Patent Literature (PTL) 1 describes a sales promotion planning assistance system for predicting a sales amount. The sales promotion planning assistance system described in PTL 1 computes the number of orders received from customers or the sales amount of customers during a desired sales period and a mutual correlation coefficient of the execution quantity for each sales promotion unit executed in a desired sales promotion season.

In addition, to separate data resulting from a plurality of factors on a factor-by-factor basis, a mixture latent variable model is frequently used in modeling. Non Patent Literature (NPL) 1 describes a method for determining the type of observation probability by approximating, for a mixture model which is a typical example of a latent variable model, a complete marginal likelihood function and maximizing its lower bound (lower limit).

CITATION LIST

Patent Literature

PTL 1: Japanese Patent Application Laid-Open No. 2013-12168

Non Patent Literature

NPL 1: Ryohei Fujimaki, Satoshi Morinaga: Factorized Asymptotic Bayesian Inference for Mixture Modeling. Proceedings of the fifteenth international conference on Artificial Intelligence and Statistics (AISTATS), March 2012.

SUMMARY OF INVENTION

Technical Problem

In the system described in PTL 1, attention is focused only on a relationship between the past number of orders received or the sales amount and the execution quantity of the sales promotion unit in predicting the sales, and regard is not given to the content of each sales promotion unit. Therefore, since it is difficult to determine a factor affecting the sales out of the factors of the sales promotion units to be executed in the system described in PTL 1, it is difficult to perform commercial message (hereinafter, referred to as "CM") planning on the basis of the factor.

It is possible to determine the type of observation probability affecting the sales by using the method described in NPL 1. The method described in NPL 1, however, has a technical problem that a model selection problem regarding a model including a hierarchical latent variable cannot be solved. This is because the method described in NPL 1 does not take hierarchical latent variables into account, and so is unable to evidently establish a computational procedure. Besides, since the method described in NPL 1 is based on a strong assumption that it is not applicable to the case where there are hierarchical latent variables, theoretical justification is lost if this method is simply applied.

An object of the present invention is to provide a CM planning assistance system, a CM planning assistance method, a CM planning assistance program, a sales prediction assistance system, a sales prediction assistance method, and a sales prediction assistance program for solving the above problems.

Solution to Problem

A CM planning assistance system according to the present invention includes: a prediction data input unit which inputs prediction data that is one or more explanatory variables that are information likely to affect future sales; an exposure pattern generation unit which generates an exposure pattern which is an explanatory variable indicating the content of a CM scheduled to be performed during a period from predicted time to future prediction target time; a component determination unit which determines the component used for predicting the sales, on the basis of a hierarchical latent structure that is a structure in which latent variables are represented by a tree structure and components representing probability models are located at nodes of a lowest level of the tree structure, gating functions for determining a branch direction in the nodes of the hierarchical latent structure, and the prediction data and the exposure pattern; and a sales prediction unit which predicts the sales on the basis of the component determined by the component determination unit and of the prediction data and the exposure pattern.

A CM planning assistance method according to the present invention includes: inputting prediction data that is one or more explanatory variables that are information likely to affect future sales; generating an exposure pattern which is an explanatory variable indicating the content of a CM scheduled to be performed during a period from predicted time to future prediction target time; determining the component used for predicting the sales, on the basis of a hierarchical latent structure that is a structure in which latent variables are represented by a tree structure and components representing probability models are located at nodes of a lowest level of the tree structure, gating functions for determining a branch direction in the nodes of the hierarchical latent structure, and the prediction data and the exposure pattern; and predicting the sales on the basis of the determined component and of the prediction data and the exposure pattern.

A CM planning assistance program according to the present invention causes a computer to perform: a prediction data input process of inputting prediction data that is one or more explanatory variables that are information likely to affect future sales; an exposure pattern generation process of generating an exposure pattern which is an explanatory variable indicating the content of a CM scheduled to be performed during a period from predicted time to future prediction target time; a component determination process of determining the component used for predicting the sales, on the basis of a hierarchical latent structure that is a structure in which latent variables are represented by a tree structure and components representing probability models are located at nodes of a lowest level of the tree structure, gating functions for determining a branch direction in the nodes of the hierarchical latent structure, and the prediction data and the exposure pattern; and a sales prediction process of predicting the sales on the basis of the component determined in the component determination process and of the prediction data and the exposure pattern.

A sales prediction assistance system according to the present invention includes: a learning data input unit which inputs learning data which is a plurality of combinations of a response variable indicating future sales and one or more explanatory variables which are information likely to affect the sales; a hierarchical latent structure setting unit which sets a hierarchical latent structure that is a structure in which latent variables are represented by a tree structure and components representing probability models are located at nodes of a lowest level of the tree structure; a variational probability computation unit which computes a variational probability of a path latent variable that is a latent variable included in a path linking a root node to a target node in the hierarchical latent structure, on the basis of the learning data input by the learning data input unit and the components; a component optimization unit which optimizes the components for the computed variational probability, on the basis of the learning data input by the learning data input unit; a gating function optimization unit which optimizes a gating function model that is a model for determining a branch direction according to the explanatory variable in a node of the hierarchical latent structure, on the basis of the variational probability of the latent variable in the node; a prediction data input unit which inputs one or more explanatory variables as prediction data; an exposure pattern generation unit which generates an exposure pattern which is an explanatory variable indicating the content of a CM scheduled to be performed during a period from predicted time to future prediction target time; a component determination unit which determines the component used for predicting the sales among the components optimized by the component optimization unit, on the basis of the gating functions optimized by the gating function optimization unit and of the prediction data and the exposure pattern; and a sales prediction unit which predicts the sales on the basis of the component determined by the component determination unit and of the prediction data and the exposure pattern.

A sales prediction assistance method according to the present invention includes: inputting learning data which is a plurality of combinations of a response variable indicating future sales and one or more explanatory variables which are information likely to affect the sales; setting a hierarchical latent structure that is a structure in which latent variables are represented by a tree structure and components representing probability models are located at nodes of a lowest level of the tree structure; computing a variational probability of a path latent variable that is a latent variable included in a path linking a root node to a target node in the hierarchical latent structure, on the basis of the input learning data and the components; optimizing the components for the computed variational probability, on the basis of the input learning data; optimizing a gating function model that is a model for determining a branch direction according to the explanatory variable in a node of the hierarchical latent structure, on the basis of the variational probability of the latent variable in the node; inputting one or more explanatory variables as prediction data; generating an exposure pattern which is an explanatory variable indicating the content of a CM scheduled to be performed during a period from predicted time to future prediction target time; determining the component used for predicting the sales among the optimized components, on the basis of the optimized gating functions and of the prediction data and the exposure pattern; and predicting the sales on the basis of the determined component and of the prediction data and the exposure pattern.

A sales prediction assistance program according to the present invention causes a computer to perform: a learning data input process of inputting learning data which is a plurality of combinations of a response variable indicating future sales and one or more explanatory variables which are information likely to affect the sales; a hierarchical latent structure setting process of setting a hierarchical latent structure that is a structure in which latent variables are represented by a tree structure and components representing probability models are located at nodes of a lowest level of the tree structure; a variational probability computation process of computing a variational probability of a path latent variable that is a latent variable included in a path linking a root node to a target node in the hierarchical latent structure, on the basis of the learning data input in the learning data input process and the components; a component optimization process of optimizing the components for the computed variational probability, on the basis of the learning data input in the learning data input process; a gating function optimization process of optimizing a gating function model that is a model for determining a branch direction according to the explanatory variable in a node of the hierarchical latent structure, on the basis of the variational probability of the latent variable in the node; a prediction data input process of inputting one or more explanatory variables as prediction data; an exposure pattern generation process of generating an exposure pattern which is an explanatory variable indicating the content of a CM scheduled to be performed during a period from predicted time to future prediction target time; a component determination process of determining the component used for predicting the sales among the components optimized in the component optimization process, on the basis of the gating functions optimized in the gating function optimization process and of the prediction data and the exposure pattern; and a sales prediction process of predicting the sales on the basis of the component determined in the component determination process and of the prediction data and the exposure pattern.

Advantageous Effects of Invention

According to the aforementioned aspects of the invention, the above-described technical means exhibit the technical effects such as enabling the future sales to be appropriately predicted.

BRIEF DESCRIPTION OF DRAWINGS

FIG. 2 is a diagram showing an example of information stored in a learning database according to at least one exemplary embodiment.

DESCRIPTION OF EMBODIMENT

Figure 1:
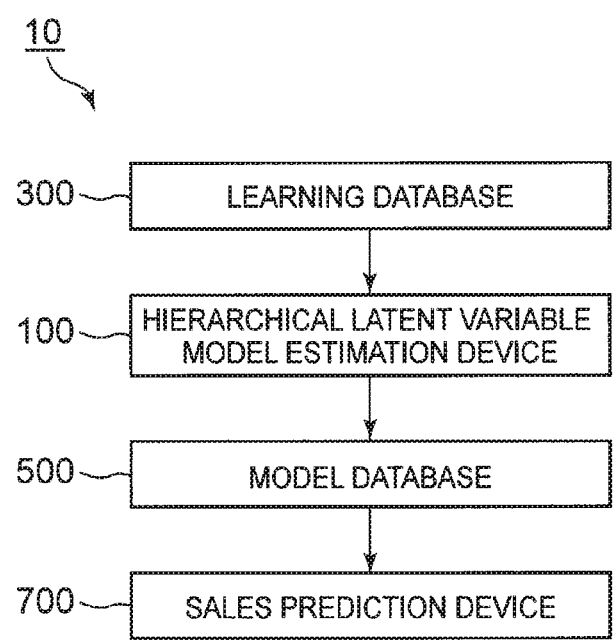
FIG. 1 is a block diagram showing a structure example of a sales prediction assistance system according to at least one exemplary embodiment.

In the present invention, a hierarchical latent variable model is a model in which latent variables (i.e. hierarchical structure) have a tree structure. Components which are probability models are located at lowest-level nodes of the tree structure. Each branch node is provided with a gating function for sorting branches according to input. In the following description, a hierarchical latent variable model of depth 2 in particular is described in detail.

Since the hierarchical structure is assumed to be the tree structure, a course from a root node to a given node is uniquely determined. Hereafter, the course (link) when linking the root node to the given node in the hierarchical latent structure is referred to as a path. By tracing a latent variable for each path, a path latent variable is determined. For example, a lowest-level path latent variable indicates a path latent variable determined for each path from the root node to a lowest-level node.

In the following description, it is assumed that a data sequence $x^n$ (n=1, ..., N) is input, where $x^n$ is an M-dimensional multivariate data sequence ($x^n=x_1^n, x_M^n$). The data sequence $x^n$ is also referred to as an observed variable. A first-level branch latent variable $z_i^n$, a lowest-level branch latent variable $z_{j|i}^n$, and a lowest-level path latent variable $z_{ij}^n$ for the observed variable $x^n$ are defined.

$z_i^n=1$ indicates that $x^n$ input to the root node branches to the first-level i-th node, and $z_i^n=0$ indicates that $x^n$ input to the root node does not branch to the first-level i-th node. $z_{j|i}^n=1$ indicates that $x^n$ input to the first-level i-th node branches to the second-level j-th node, and $z_{j|i}^n=0$ indicates that $x^n$ input to the first-level i-th node does not branch to the second-level j-th node. $z_{ij}^n=1$ indicates that $x^n$ corresponds to the component traced by passing through the first-level i-th node and the second-level j-th node, and $z_{ij}^n=0$ indicates that $x^n$ does not correspond to the component traced by passing through the first-level i-th node and the second-level j-th node.

Since $\Sigma_i z_i^n=1$, $\Sigma_j z_{j|i}^n=1$, and $z_{ij}^n=z_i^n \cdot z_{j|i}^n$ are satisfied, $z_i^n=\Sigma_j z_{ij}^n$ holds true. The combination of x and z which is a representative value of the lowest-level path latent variable $z_{ij}^n$ is referred to as a "complete variable". In contrast, x is referred to as an "incomplete variable".

A hierarchical latent variable model joint distribution of depth 2 for the complete variable is represented by the following Expression 1.

[Math. 1]

$$p(x^N, z^N \mid M) = p(x^N, z_{1st}^N, z_{2nd}^N \mid M)$$
$$= \int \prod_{n=1}^{N} \left\{ p(z_{1st}^n \mid \beta) \prod_{i=1}^{K_1} p\left(z_{2nd|i}^n \mid \beta_i\right)^{z_i^n} \prod_{i=1}^{K_1} \prod_{j=1}^{K_2} p(x^n \mid \phi_{ij})^{z_i^n z_{j|i}^n} \right\} d\theta \quad \text{(Expression 1)}$$

That is, the hierarchical latent variable model joint distribution of depth 2 for the complete variable is defined by $P(x, y)=P(x, z_{1st}, z_{2nd})$ included in Expression 1 shown above. Here, a representative value of $z_i^n$ is denoted by $z_{1st}^n$, and a representative value of $z_{jli}^n$ is denoted by $z_{2nd}^n$. Moreover, a variational distribution for the first-level branch latent variable $z_i^n$ is denoted by $q(z_i^n)$, and a variational distribution for the lowest-level path latent variable $z_{ij}^n$ is denoted by $q(z_{ij}^n)$.

In Expression 1 shown above, $K_1$ denotes the number of nodes of the first level, and $K_2$ denotes the number of nodes branched from each of the nodes of the first level. The components of the lowest level are represented by $K_1 \cdot K_2$. Meanwhile, $\theta=(\beta, \beta1, \ldots, \beta K_1, \varphi1, \ldots, \varphi K_1 \cdot K_2)$ denotes the parameter of the model. Here, $\beta$ is a branch parameter of the root node, $\beta k$ is a branch parameter of a first-level k-th node, and $\varphi k$ is an observation parameter for a k-th component.

Furthermore, $S1, \ldots, SK_1 \cdot K_2$ represents the type of observation probability corresponding to $\varphi k$. As an example, in the case of multivariate data generation probability, candidates that can be S1 to $SK_1 \cdot K_2$ are {normal distribution, log normal distribution, exponential distribution} and the like. As another example, in the case of outputting a polynomial curve, candidates that can be S1 to $SK_1 \cdot K_2$ are {zero-degree curve, linear curve, quadratic curve, cubic curve} and the like.

In the following description, a hierarchical latent variable model of depth 2 is used as a specific example. Note, however, that the hierarchical latent variable model according to at least one exemplary embodiment is not limited to a hierarchical latent variable model of depth 2, and may be a hierarchical latent variable model of depth 1 or depth 3 or more. In these cases, too, Expression 1 shown above and Expressions 2 to 4 shown below can be derived as in the case of the hierarchical latent variable model of depth 2, and so the estimation device can be realized by the same structure.

Though the following describes a distribution in the case where a target variable is X, the present invention is also applicable in the case where an observation distribution is a conditional model P(Y|X) (Y is a target random variable) as in regression or discrimination.

An essential difference between the prediction device according to an exemplary embodiment and the estimation method for the mixture latent variable model described in NPL 1 is described below, before describing exemplary embodiments.

In the method described in NPL 1, a typical mixture model in which a latent variable is an indicator of each component is assumed, and an optimization criterion is derived as in Expression 10 in NPL 1. However, as Fisher information matrices are given in the form of Expression 6 in NPL 1, it is assumed in the method described in NPL 1 that a probability distribution of the latent variable which is the indicator of each component depends only on a mixture ratio of the mixture model. Therefore, component switching according to input cannot be realized, and so this optimization criterion is inappropriate.

In order to solve the problem stated above, it is necessary to set hierarchical latent variables and perform computation using an appropriate optimization criterion, as described in the exemplary embodiments described below. In the following exemplary embodiments, a multi-stage specific model for sorting branches at each branch node according to input is assumed as an appropriate optimization criterion.

The following describes the exemplary embodiments with reference to drawings.

Exemplary Embodiment 1

FIG. 1 is a block diagram showing a structure example of a sales prediction assistance system according to at least one exemplary embodiment. The sales prediction assistance system 10 according to this exemplary embodiment includes a hierarchical latent variable model estimation device 100, a learning database 300, a model database 500, and a sales prediction device 700. The sales prediction assistance system 10 generates a model used for sales prediction on the basis of sales information collected in the past, information assumed to be affect the sales, or the like and assists sales prediction by using the model.

The hierarchical latent variable model estimation device 100 estimates the model for predicting future sales by using data stored in the learning database 300 and records the model into the model database 500.

FIG. 2 is a diagram showing an example of information stored in the learning database 300 according to at least one exemplary embodiment. The learning database 300 stores sales information, metadata related to information transmission with an advertising medium, information transmitted by using social media, or the like.

Specifically, the learning database 300 may store a product table including data related to a target product for sales prediction. The product table stores a product name, a product category, a product classification, a sales start date, a set price, and the like in association with a product ID as exemplified in FIG. 2(A). The product ID is information for uniquely identifying a product.

In addition, the learning database 300 may store a meteorological table including meteorological data. The meteorological table stores a temperature, the day's maximum temperature, the day's minimum temperature, precipitation, weather, humidity, and the like in association with the date and time and with the area as exemplified in FIG. 2(B).

Moreover, the learning database 300 may store a sales table including data related to the sales of products. As exemplified in FIG. 2(C), the sales table stores the number of sold products and the sales amount for each period of the product in association with each product ID. The unit of the period during which the data is stored is arbitrary and may be a time unit or a day unit, for example. In this case, for example, if a one-week total sales is needed, it is possible to compute the one-week total sales by adding up the sales for the target period.

Moreover, the content of the sales table is not limited to the sales achieved within a certain period of time, but may be a difference between periods compared with each other, for example. Furthermore, similarly to the above case, the difference between periods compared with each other can be acquired by adding up the sales for the compared periods and calculating the difference between the added-up sales.

Furthermore, the learning database 300 may store an advertising medium metadata table including metadata related to information transmission with various advertising media such as television broadcasting and the Internet. FIG. 2(D) is an explanatory diagram showing an example of metadata in the case of using a television (hereinafter, referred to as TV) as an advertising medium. The advertising medium metadata table stores the exposed time of the transmitted information in association with the product ID, the classification, the transmitted content, or the like for each predetermined period as exemplified in FIG. 2(D).

The advertising medium metadata table may additionally store the CM air time including a target keyword, the exposed time of shows (CM) by category, exposed time by time zone, or the like. Moreover, the advertising medium metadata table may sum up these kinds of information according to the sales period summed up on the sales table exemplified in FIG. 2(C).

Moreover, the learning database 300 may store a transmitted information table including information transmitted through social media. FIG. 2(E) is an explanatory diagram showing an example of information transmitted through Twitter® to the social media. The transmitted information table stores allied keywords grouped.

Information exemplified in FIG. 2(E) is obtained by generating a predetermined number of clusters by using a topic extraction engine on the basis of the respective keywords transmitted through Twitter® and listing words included in the clusters. The topic extraction engine is a module for automatically collecting up words according to a statistical model based on the way of thinking that words having similar meanings appear in similar documents.

An example shown in FIG. 2(E), for example, shows that tasty (adjective), eat (verb), artisan (noun), and the like determined to be keywords representing the contents of the typical ramen are keywords grouped in one cluster.

The model database 500 stores a model for predicting future sales estimated by the hierarchical latent variable model estimation device 100. The model database 500 is formed of a non-temporary tangible medium such as a hard disk drive or a solid state drive.

The sales prediction device 700 receives an input of data related to the product sales and predicts future sales on the basis of the data and a model stored in the database 500.

Figure 3:
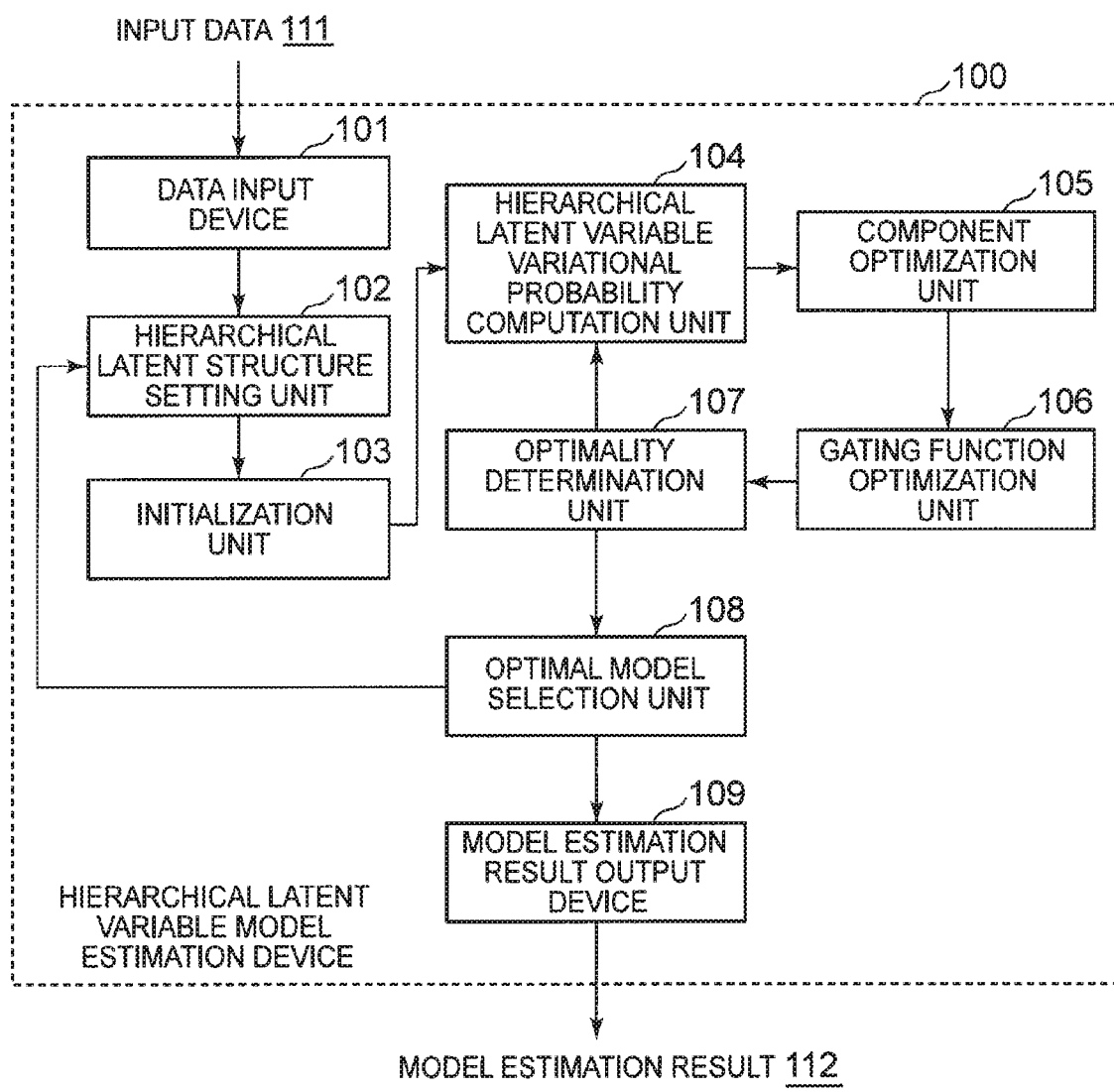
FIG. 3 is a block diagram showing a structure example of a hierarchical latent variable model estimation device according to at least one exemplary embodiment.

FIG. 3 is a block diagram showing a structure example of a hierarchical latent variable model estimation device according to at least one exemplary embodiment. A hierarchical latent variable model estimation device 100 in this exemplary embodiment includes a data input device 101, a hierarchical latent structure setting unit 102, an initialization unit 103, a hierarchical latent variable variational probability computation unit 104, a component optimization unit 105, a gating function optimization unit 106, an optimality determination unit 107, an optimal model selection unit 108, and a model estimation result output device 109.

The hierarchical latent variable model estimation device 100, upon input of input data 111 generated based on data stored in the learning database 300, optimizes the hierarchical latent structure and the type of observation probability for the input data 111, outputs the result of optimization as a model estimation result 112, and records the result in the model database 500. In this exemplary embodiment, the input data 111 is one example of learning data.

Figure 4:
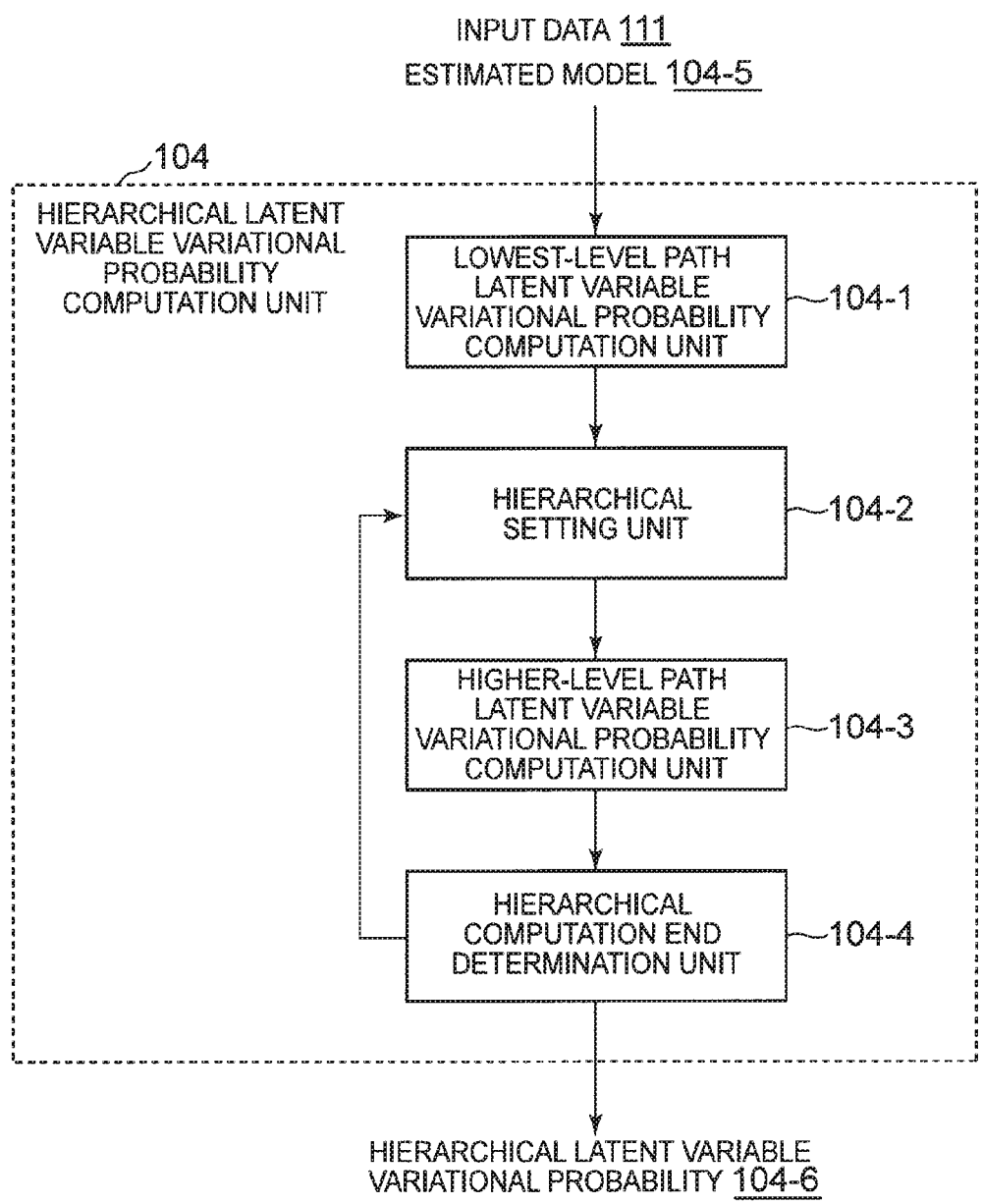
FIG. 4 is a block diagram showing a structure example of a hierarchical latent variable variational probability computation unit according to at least one exemplary embodiment.

FIG. 4 is a block diagram showing a structure example of the hierarchical latent variable variational probability computation unit 104 according to at least one exemplary embodiment. The hierarchical latent variable variational probability computation unit 104 includes a lowest-level path latent variable variational probability computation unit 104-1, a hierarchical setting unit 104-2, a higher-level path latent variable variational probability computation unit 104-3, and a hierarchical computation end determination unit 104-4.

The hierarchical latent variable variational probability computation unit 104 outputs a hierarchical latent variable variational probability 104-6, upon input of the input data 111 and a model 104-5 estimated by the below-mentioned component optimization unit 105. The hierarchical latent variable variational probability computation unit 104 will be described in detail later. A component in this exemplary embodiment is a value indicating a weight related to each explanatory variable. The sales prediction device 700 is able to acquire a response variable by computing the total sum of the explanatory variables each multiplied by the weight indicated by the component.

Figure 5:
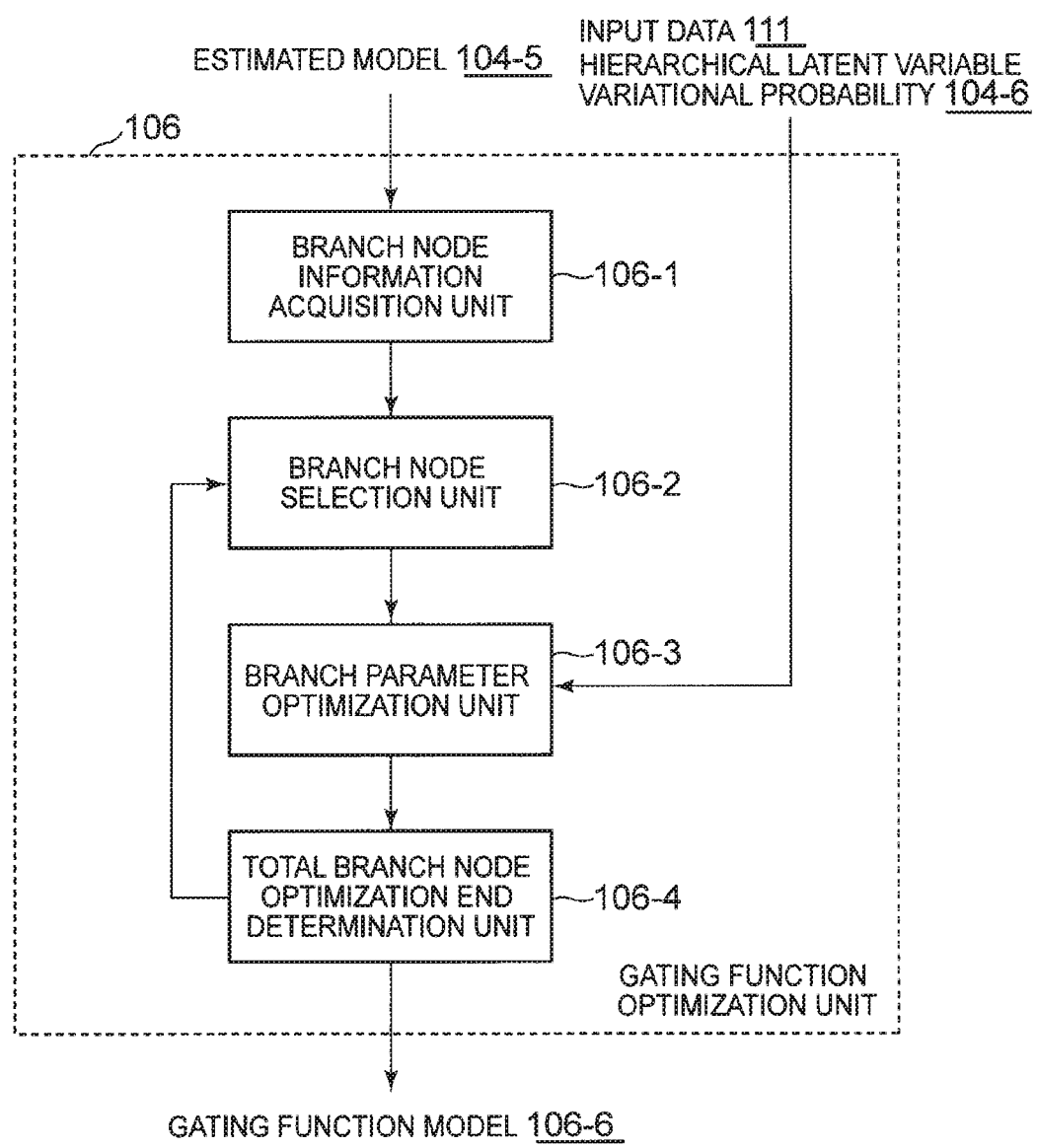
FIG. 5 is a block diagram showing a structure example of a gating functions optimization unit according to at least one exemplary embodiment.

FIG. 5 is a block diagram showing a structure example of the gating function optimization unit 106 according to at least one exemplary embodiment. The gating function optimization unit 106 includes a branch node information acquisition unit 106-1, a branch node selection unit 106-2, a branch parameter optimization unit 106-3, and a total branch node optimization end determination unit 106-4.

The gating function optimization unit 106 outputs a gating function model 106-6, upon input of the input data 111, the hierarchical latent variable variational probability 104-6 computed by the below-mentioned hierarchical latent variable variational probability computation unit 104, and the model 104-5 estimated by the component optimization unit 105. The gating function optimization unit 106 will be described in detail later. A gating function in this exemplary embodiment is a function for determining whether or not information included in the input data 111 satisfies a predetermined condition. Furthermore, the gating function is provided so as to correspond to an internal node of the hierarchical latent structure. The sales prediction device 700 determines a next node to trace, according to the determination result of the gating function, at the time of tracing the node of the hierarchical latent structure.

The data input device 101 is a device for inputting the input data 111. The data input device 101 generates response variables showing the known sales of the product for each predetermined period (for example, one day, one week, or the like), on the basis of the data recorded in the sales table of the learning database 300. As the response variables, the sales for each predetermined time range of a single product in a single store, the sales for each predetermined time range of a single product in all stores, the sales amount for each predetermined time range of all products in one store, and the like can be employed, for example.

In addition, the data input device 101 generates one or more explanatory variables which are information likely to affect the response variable, for each response variable, on the basis of the data recorded in the tables (for example, the product table, the meteorological table, the sales table, the advertising medium metadata table, and the transmitted information table) of the learning database 300. As the explanatory variables, the number of exposure times of the transmitted content, the exposed time, a difference in the exposed time for each period of the transmitted content, the past sales quantity of a target product.

The data input device 101 inputs a plurality of combinations of the response variable and the explanatory variable as the input data 111. When inputting the input data 111, the data input device 101 simultaneously inputs parameters necessary for model estimation, such as candidates for the type of observation probability and the number of components. In this exemplary embodiment, the data input device 101 is an example of the learning data input unit.

The hierarchical latent structure setting unit 102 selects and sets a structure of a hierarchical latent variable model as an optimization candidate, from the input candidates for the type of observation probability and the number of components. The latent structure used in this exemplary embodiment is a tree structure. Hereafter, the set number of components is denoted by C, and the mathematical expressions used in the description relate to a hierarchical latent variable model of depth 2. Note that the hierarchical latent structure setting unit 102 may store the selected hierarchical latent variable model structure in an internal memory.

For example, in the case of a binary tree model (model in which each branch node has two branches) of a tree structure of depth 2, the hierarchical latent structure setting unit 102 selects a hierarchical latent structure having two first-level nodes and four second-level nodes (lowest-level nodes in this exemplary embodiment).

The initialization unit 103 performs an initialization process for estimating the hierarchical latent variable model. The initialization unit 103 is capable of executing the initialization process by an arbitrary method. For example, the initialization unit 103 may randomly set the type of observation probability for each component, and randomly set a parameter of each observation probability according to the set type. Moreover, the initialization unit 103 may randomly set a lowest-level path variational probability of a hierarchical latent variable.

The hierarchical latent variable variational probability computation unit 104 computes a variational probability of a path latent variable for each level. Here, the parameter θ has been computed by the initialization unit 103 or by the component optimization unit 105 and the gating function optimization unit 106. Accordingly, the hierarchical latent variable variational probability computation unit 104 computes the variational probability using the parameter θ.

The hierarchical latent variable variational probability computation unit 104 computes the variational probability, by Laplace-approximating a marginal log-likelihood function with respect to an estimate (e.g. a maximum likelihood estimate or a maximum a posteriori probability estimate) for the complete variable and maximizing its lower bound. Such computed value is hereafter referred to as an optimization criterion A.

A procedure for computing the optimization criterion A is described below, using a hierarchical latent variable model of depth 2 as an example. A marginal log-likelihood is given by the following Expression 2.

[Math. 2]

$$\log p(x^N \mid M) \geq \sum_{z^N} q(z^N) \log \left\{ \frac{p(x^N, z^N \mid M)}{q(z^N)} \right\} \quad \text{(Expression 2)}$$

First, consider the lower bound of the marginal log-likelihood given by Expression 2 shown above. In Expression 2, the equality holds true when the lowest-level path latent variable variational probability $q(z'')$ is maximized. Laplace-approximating the marginal likelihood of the complete variable in the numerator using the maximum likelihood estimate for the complete variable yields an approximation of the marginal log-likelihood function represented by the following Expression 3.

[Math. 3]

$$\mathcal{J}(q, \overline{\theta}, x^N) = \sum_{z^N} q(z^N) \Bigg\{ \log p(x^N, z^N \mid \overline{\theta}) - \quad \text{(Expression 3)}$$

$$\frac{D_\beta}{2} \log N - \sum_{i=1}^{K_1} \frac{D_{\beta_i}}{2} \log \left( \sum_{n=1}^{N} \sum_{j=1}^{K_2} z_{ij}^n \right) -$$

$$\sum_{i=1}^{K_1} \sum_{j=1}^{K_2} \frac{D_{\phi_{ij}}}{2} \log \left( \sum_{n=1}^{N} z_{ij}^n \right) - \log q(z^N) \Bigg\}$$

In Expression 3, the superscript bar indicates the maximum likelihood estimate for the complete variable, and D* indicates the dimensionality of the subscript parameter*.

Next, by use of the property of the maximum likelihood estimate to maximize the log-likelihood function and the fact that the logarithm function is a concave function, the lower bound of Expression 3 is computed according to the following Expression 4.

[Math. 4]

$$\mathcal{G}(q, q', q'', \theta, x^N) = \quad \text{(Expression 4)}$$

$$\sum_{z^N} q(z^N) \Bigg[ \log p(x^N, z^N \mid \overline{\theta}) - \frac{D_\beta}{2} \log N -$$

$$\sum_{i=1}^{K_1} \frac{D_{\beta_i}}{2} \left\{ \log \left( \sum_{n=1}^{N} q'(z_i^n) \right) + \frac{\sum_{n=1}^{N} \sum_{j=1}^{K_2} z_{ij}^n}{\sum_{n=1}^{N} q'(z_i^n)} - 1 \right\} -$$

$$\sum_{i=1}^{K_1} \sum_{j=1}^{K_2} \frac{D_{\phi_{ij}}}{2} \left\{ \log \left( \sum_{n=1}^{N} q''(z_{ij}^n) \right) + \frac{\sum_{n=1}^{N} z_{ij}^n}{\sum_{n=1}^{N} q''(z_{ij}^n)} - 1 \right\} -$$

$$\log q(z^N) \Bigg]$$

A variational distribution q' of the first-level branch latent variable and a variational distribution q'' of the lowest-level path latent variable are each obtained by maximizing Expression 4 for the variational distribution. Here, q" and θ are fixed so that q"=q$^{(t-1)}$ and θ=θ$^{(t-1)}$, and q' is fixed at the value represented by the following Expression A.

$$q' = \Sigma_{j=1}^{k2} q^{(t-1)} \Sigma_{j=1}^{k2} q \quad \text{(Expression A)}.$$

Here, the superscript (t) indicates the t-th iteration in iterative computation of the hierarchical latent variable variational probability computation unit 104, the component optimization unit 105, the gating function optimization unit 106, and the optimality determination unit 107.

The following describes the operation of the hierarchical latent variable variational probability computation unit 104 with reference to FIG. 4.

The lowest-level path latent variable variational probability computation unit 104-1 receives input of the input data 111 and the estimated model 104-5, and computes the lowest-level latent variable variational probability $q(z^N)$. The hierarchical setting unit 104-2 sets the lowest level as the variational probability computation target. Specifically, the lowest-level path latent variable variational probability computation unit 104-1 computes variational probability of each estimated model 104-5, for each combination of the response variable and the explanatory variable of the input data 111. The computation of the variational probability is performed by comparing a solution obtained by substituting the explanatory variable of the input data 111 into the estimated model 104-5 with the response variable of the input data 111.

The higher-level path latent variable variational probability computation unit 104-3 computes the path latent variable variational probability of the immediately higher level. In detail, the higher-level path latent variable variational probability computation unit 104-3 computes the sum of latent variable variational probabilities of the current level having the same branch node as the parent, and sets the sum as the path latent variable variational probability of the immediately higher level.

The hierarchical computation end determination unit 104-4 determines whether or not there is any higher level for which the variational probability is to be computed. In the case where the hierarchical computation end determination unit 104-4 determines that there is the higher level, the hierarchical setting unit 104-2 sets the immediately higher level as the variational probability computation target. Subsequently, the higher-level path latent variable variational probability computation unit 104-3 and the hierarchical computation end determination unit 104-4 repeat the above-mentioned process. In the case where the hierarchical computation end determination unit 104-4 determines that there is no higher level, the hierarchical computation end determination unit 104-4 determines that the path latent variable variational probability has been computed for all levels.

The component optimization unit 105 optimizes the model (parameter θ and type S) of each component for Expression 4 shown above, and outputs the optimized estimated model 104-5. In the case of a hierarchical latent variable model of depth 2, the component optimization unit 105 fixes q and q" at the lowest-level path latent variable variational probability $q^{(t)}$ computed by the hierarchical latent variable variational probability computation unit 104, and fixes q' at the higher-level path latent variable variational probability represented by Expression A shown above. The component optimization unit 105 then computes a model for maximizing the value of G in Expression 4.

G defined by Expression 4 can decompose the optimization function for each component. Accordingly, S1 to $SK_1 \cdot K_2$ and parameters φ1 to $φK_1 \cdot K_2$ can be separately optimized without taking into account the component type combination (e.g. which type of S1 to $SK_1 \cdot K_2$ is designated). The capability of optimizing in such a way is important in this process. Thus, the type of component can be optimized while avoiding combination explosion.

The following describes the operation of the gating function optimization unit 106 with reference to FIG. 5. The branch node information acquisition unit 106-1 extracts a branch node list using the estimated model 104-5 estimated by the component optimization unit 105. The branch node selection unit 106-2 selects one branch node from the extracted branch node list. Hereafter, the selected node is also referred to as a selection node.

The branch parameter optimization unit 106-3 optimizes the branch parameter of the selection node, using the input data 111 and the latent variable variational probability for the selection node obtained from the hierarchical latent variable variational probability 104-6. The branch parameter of the selection node corresponds to the above-mentioned gating function.

The total branch node optimization end determination unit 106-4 determines whether or not all branch nodes extracted by the branch node information acquisition unit 106-1 have been optimized. In the case where all branch nodes have been optimized, the gating function optimization unit 106 ends the process. In the case where all branch nodes have not been optimized, the branch node selection unit 106-2 performs its process, and then the branch parameter optimization unit 106-3 and the total branch node optimization end determination unit 106-4 perform their respective processes.

A specific example of the gating function is described below, using a gating function based on a Bernoulli distribution for a binary tree hierarchical model. Hereafter, the gating function based on the Bernoulli distribution is also referred to as a Bernoulli gating function. Let $x_d$ be the d-th dimension of x, $g^-$ be a probability of branching to the lower left of the binary tree when this value does not exceed a threshold w, and $g^+$ be a probability of branching to the lower left of the binary tree when this value exceeds the threshold w. The branch parameter optimization unit 106-3 optimizes the above-mentioned optimization parameters d, w, $g^-$, and $g^+$, based on the Bernoulli distribution. In this case, each parameter has an analytical solution unlike the one based on a log it function described in NPL 1, which contributes to faster optimization.

The optimality determination unit 107 determines whether or not the optimization criterion A computed using Expression 4 shown above has converged. In the case where the optimization criterion A has not converged, the processes by the hierarchical latent variable variational probability computation unit 104, the component optimization unit 105, the gating function optimization unit 106, and the optimality determination unit 107 are repeated. For example, the optimality determination unit 107 may determine that the optimization criterion A has converged in the case where an increment of the optimization criterion A is less than a predetermined threshold.

Hereafter, the processes by the hierarchical latent variable variational probability computation unit 104, the component optimization unit 105, the gating function optimization unit 106, and the optimality determination unit 107 are also collectively referred to as the processes by the hierarchical latent variable variational probability computation unit 104 to the optimality determination unit 107. The processes by the hierarchical latent variable variational probability computation unit 104 to the optimality determination unit 107 are repeatedly performed to update the variational distribution and the model, as a result of which an appropriate model can be selected. Note that repeatedly performing these processes ensures that the optimization criterion A increases monotonically.

The optimal model selection unit 108 selects an optimal model. In detail, in the case where the optimization criterion A computed as a result of the processes by the hierarchical latent variable variational probability computation unit 104 to the optimality determination unit 107 is greater than the currently set optimization criterion A for the number C of hidden states set by the hierarchical latent structure setting unit 102, the optimal model selection unit 108 selects the model as the optimal model.

The model estimation result output device 109 outputs the optimal number of hidden states, type of observation probability, parameter, variational distribution, and the like as the model estimation result 112, in the case where model optimization has been completed for the candidate of the hierarchical latent variable model structure set from the input candidates for the type of observation probability and the number of components. In the case where there is any candidate for which optimization has not been completed, on the other hand, the procedure goes to the process by the hierarchical latent structure setting unit 102, and the same processes as described above are performed.

The hierarchical latent structure setting unit 102, the initialization unit 103, the hierarchical latent variable variational probability computation unit 104 (more specifically, the lowest-level path latent variable variational probability computation unit 104-1, the hierarchical setting unit 104-2, the higher-level path latent variable variational probability computation unit 104-3, and the hierarchical computation end determination unit 104-4), the component optimization unit 105, the gating function optimization unit 106 (more specifically, the branch node information acquisition unit 106-1, the branch node selection unit 106-2, the branch parameter optimization unit 106-3, and the total branch node optimization end determination unit 106-4), the optimality determination unit 107, and the optimal model selection unit 108 are realized by a CPU of a computer operating according to a program (sales prediction assistance program).

For example, the program may be stored in a storage unit (not shown) in the hierarchical latent variable model estimation device 100, with the CPU reading the program and, according to the program, operating as the hierarchical latent structure setting unit 102, the initialization unit 103, the hierarchical latent variable variational probability computation unit 104 (more specifically, the lowest-level path latent variable variational probability computation unit 104-1, the hierarchical setting unit 104-2, the higher-level path latent variable variational probability computation unit 104-3, and the hierarchical computation end determination unit 104-4), the component optimization unit 105, the gating function optimization unit 106 (more specifically, the branch node information acquisition unit 106-1, the branch node selection unit 106-2, the branch parameter optimization unit 106-3, and the total branch node optimization end determination unit 106-4), the optimality determination unit 107, and the optimal model selection unit 108.

Alternatively, the hierarchical latent structure setting unit 102, the initialization unit 103, the hierarchical latent variable variational probability computation unit 104, the component optimization unit 105, the gating function optimization unit 106, the optimality determination unit 107, and the optimal model selection unit 108 may each be realized by dedicated hardware.

Figure 6:
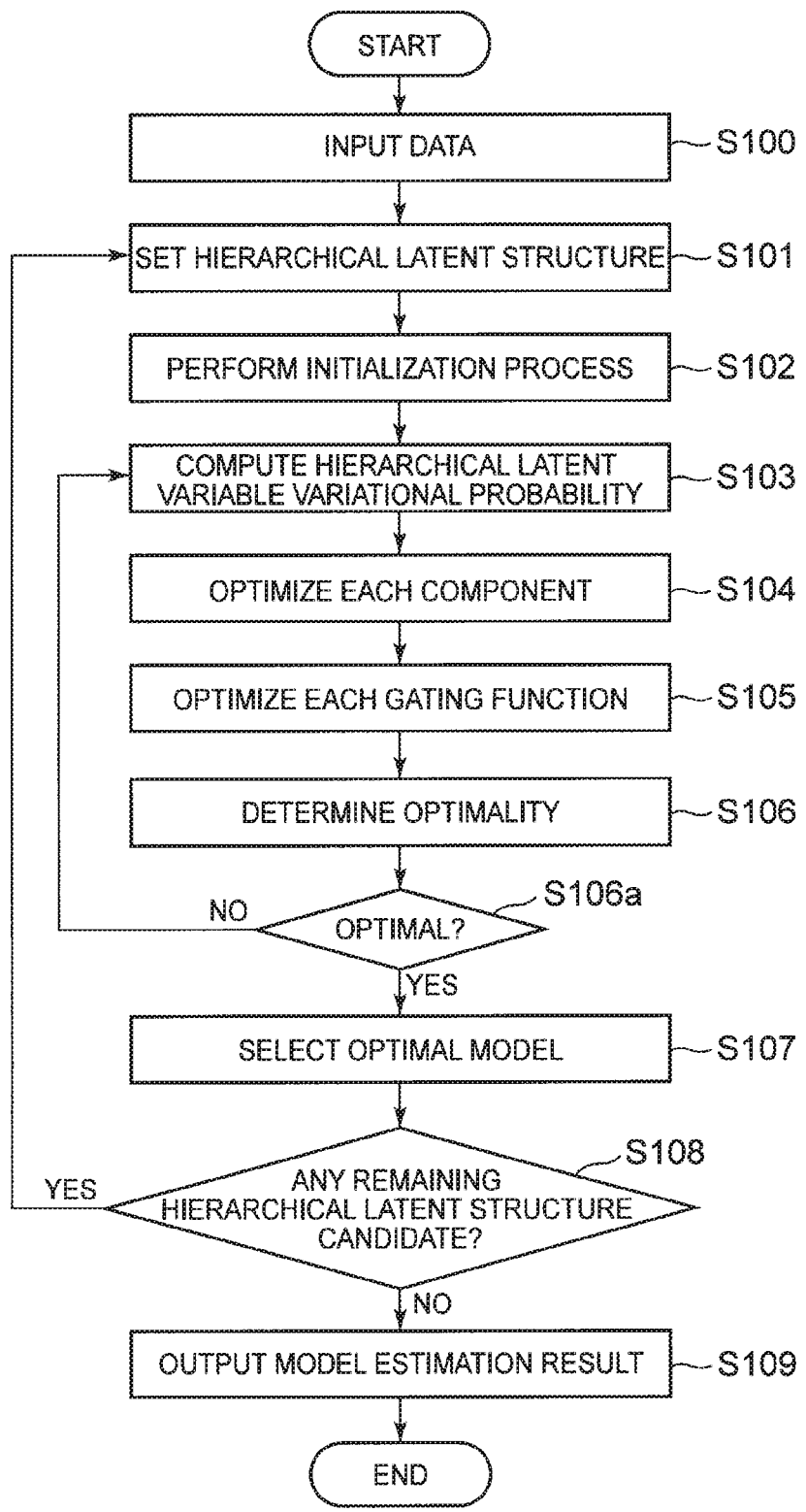
FIG. 6 is a flowchart showing an operation example of a hierarchical latent variable model estimation device according to at least one exemplary embodiment.

The following describes the operation of the hierarchical latent variable model estimation device in this exemplary embodiment. FIG. 6 is a flowchart showing an operation example of the hierarchical latent variable model estimation device according to at least one exemplary embodiment.

First, the data input device 101 inputs the input data 111 (step S100). Next, the hierarchical latent structure setting unit 102 selects and sets a hierarchical latent structure which has not been optimized, from the input hierarchical latent structure candidate values (step S101). Next, the initialization unit 103 performs the initialization process of the latent variable variational probability and the parameter used for estimation, for the set hierarchical latent structure (step S102).

Next, the hierarchical latent variable variational probability computation unit 104 computes the variational probability of each path latent variable (step S103). Next, the component optimization unit 105 optimizes each component by estimating the type of observation probability and the parameter (step S104).

Next, the gating function optimization unit 106 optimizes the branch parameter in each branch node (step S105). Next, the optimality determination unit 107 determines whether or not the optimization criterion A has converged (step S106). That is, the optimality determination unit 107 determines the optimality of the model.

In the case where, in step S106, it is not determined that the optimization criterion A has converged, i.e. it is determined that the model is not optimal (step S106a: No), the processes of steps S103 to S106 are repeated.

In the case where, in step S106, it is determined that the optimization criterion A has converged, i.e. it is determined that the model is optimal (step S106a: Yes), on the other hand, the optimal model selection unit 108 compares the value of the optimization criterion A according to the currently set optimal model (e.g. the number of components, the type of observation probability, the parameter) with the value of the optimization criterion A according to the model currently set as an optimal model, and selects the model with the greater value as the optimal model (step S107).

Next, the optimal model selection unit 108 determines whether or not any hierarchical latent structure candidate which has not been estimated remains (step S108). In the case where the candidate remains (step S108: Yes), the processes of steps S101 to S108 are repeated. In the case where no candidate remains (step S108: No), on the other hand, the model estimation result output device 109 outputs the model estimation result, and ends the process (step S109). In other words, the model estimation result output device 109 records the component optimized by the component optimization unit 105 and the gating function optimized by the gating functions optimization unit 106 into the model database 500.

Figure 7:
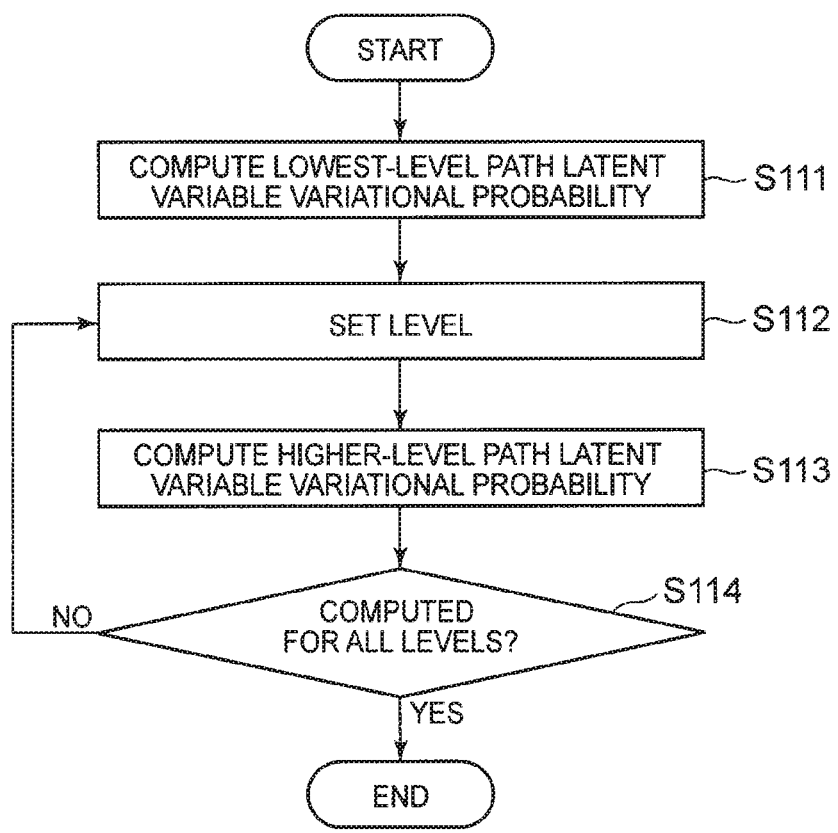
FIG. 7 is a flowchart showing an operation example of a hierarchical latent variable variational probability computation unit according to at least one exemplary embodiment.

The following describes the operation of the hierarchical latent variable variational probability computation unit 104 in this exemplary embodiment. FIG. 7 is a flowchart showing an operation example of the hierarchical latent variable variational probability computation unit 104 according to at least one exemplary embodiment.

First, the lowest-level path latent variable variational probability computation unit 104-1 computes the lowest-level path latent variable variational probability (step S111). Next, the hierarchical setting unit 104-2 sets to which level the path latent variable has been computed (step S112). Next, the higher-level path latent variable variational probability computation unit 104-3 computes the path latent variable variational probability of the immediately higher level, using the path latent variable variational probabilities of the level set by the hierarchical setting unit 104-2 (step S113).

Next, the hierarchical computation end determination unit 104-4 determines whether or not any level for which the path latent variable has not been computed remains (step S114). In the case where the level for which the path latent variable has not been computed remains (step S114: No), the processes of steps S112 to S113 are repeated. In the case where no level for which the path latent variable has not been computed remains (step S114: Yes), on the other hand, the hierarchical latent variable variational probability computation unit 104 ends the process.

Figure 8:
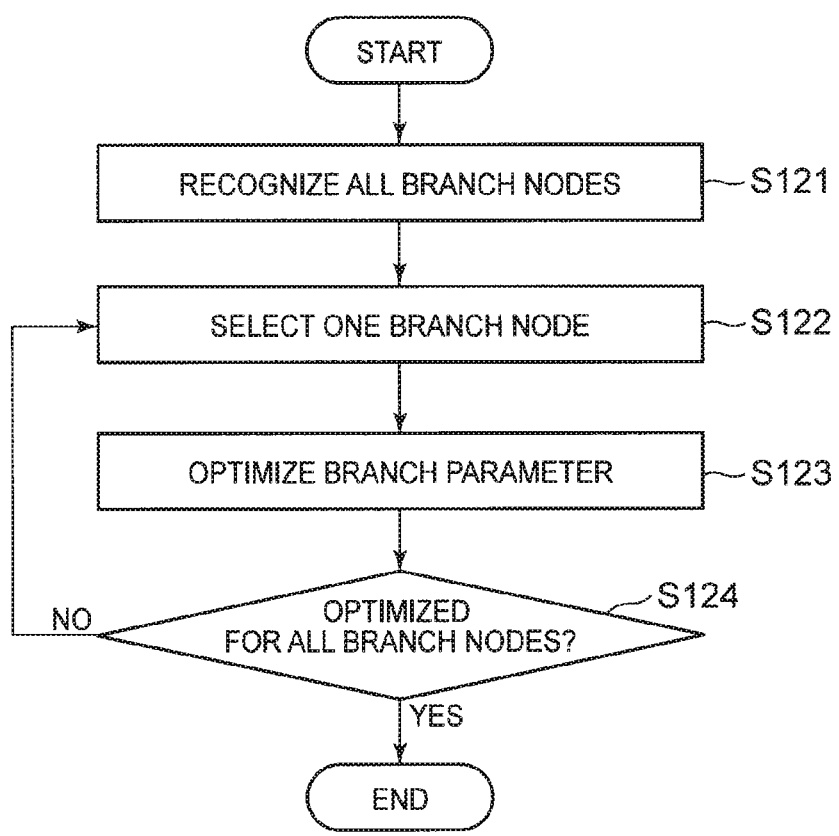
FIG. 8 is a flowchart showing an operation example of a gating functions optimization unit according to at least one exemplary embodiment.

The following describes the operation of the gating function optimization unit 106 in this exemplary embodiment. FIG. 8 is a flowchart showing an operation example of the gating function optimization unit 106 according to at least one exemplary embodiment.

First, the branch node information acquisition unit 106-1 recognizes all branch nodes (step S121). Next, the branch node selection unit 106-2 selects one branch node as the optimization target (step S122). Next, the branch parameter optimization unit 106-3 optimizes the branch parameter in the selected branch node (step S123).

Next, the total branch node optimization end determination unit 106-4 determines whether or not any branch node which has not been optimized remains (step S124). In the case where the branch node which has not been optimized remains (step S124: No), the processes of steps S122 to S123 are repeated. In the case where no branch node which has not been optimized remains, on the other hand (step S124: Yes), the gating function optimization unit 106 ends the process.

As described above, in this exemplary embodiment, the hierarchical latent structure setting unit 102 sets the hierarchical latent structure. Here, the hierarchical latent structure is a structure in which latent variables are represented by a tree structure, with components representing probability models being located at lowest-level nodes of the tree structure.

The hierarchical latent variable variational probability computation unit 104 computes the variational probability of the path latent variable (in other words, the optimization criterion A). The hierarchical latent variable variational probability computation unit 104 may compute the variational probability of the latent variable for each level of the tree structure, from the lowest-level node in sequence. In addition, the hierarchical latent variable variational probability computation unit 104 may compute the variational probability so as to maximize the marginal log-likelihood.

Following this, the component optimization unit 105 optimizes the component for the computed variational probability, and the gating function optimization unit 106 optimizes the gating function model on the basis of the variational probability of the latent variable in the node of the hierarchical latent structure. Note that the gating function model is a model for determining the branch direction according to the multivariate data in the node of the hierarchical latent structure.

Since the hierarchical latent variable model for the multivariate data is estimated by the structure described above, the hierarchical latent variable model including hierarchical latent variables can be estimated with appropriate computational complexity without losing theoretical justification. Moreover, the use of the hierarchical latent variable model estimation device 100 eliminates a need for manually setting an appropriate criterion for classifying components.

Here, the hierarchical latent structure setting unit 102 may set the hierarchical latent structure in which the latent variables are represented by a binary tree structure, where the gating function optimization unit 106 optimizes the gating function model based on a Bernoulli distribution, on the basis of the variational probability of the latent variable in the node. In this case, each parameter has an analytical solution, which contributes to faster optimization.

By these processes, the hierarchical latent variable model estimation device 100 is able to separate the components into a broadcast pattern of transmitted contents, a broadcasting time pattern for each period of transmitted contents, a sales pattern for a predetermined period of target products, and the like.

Figure 9:
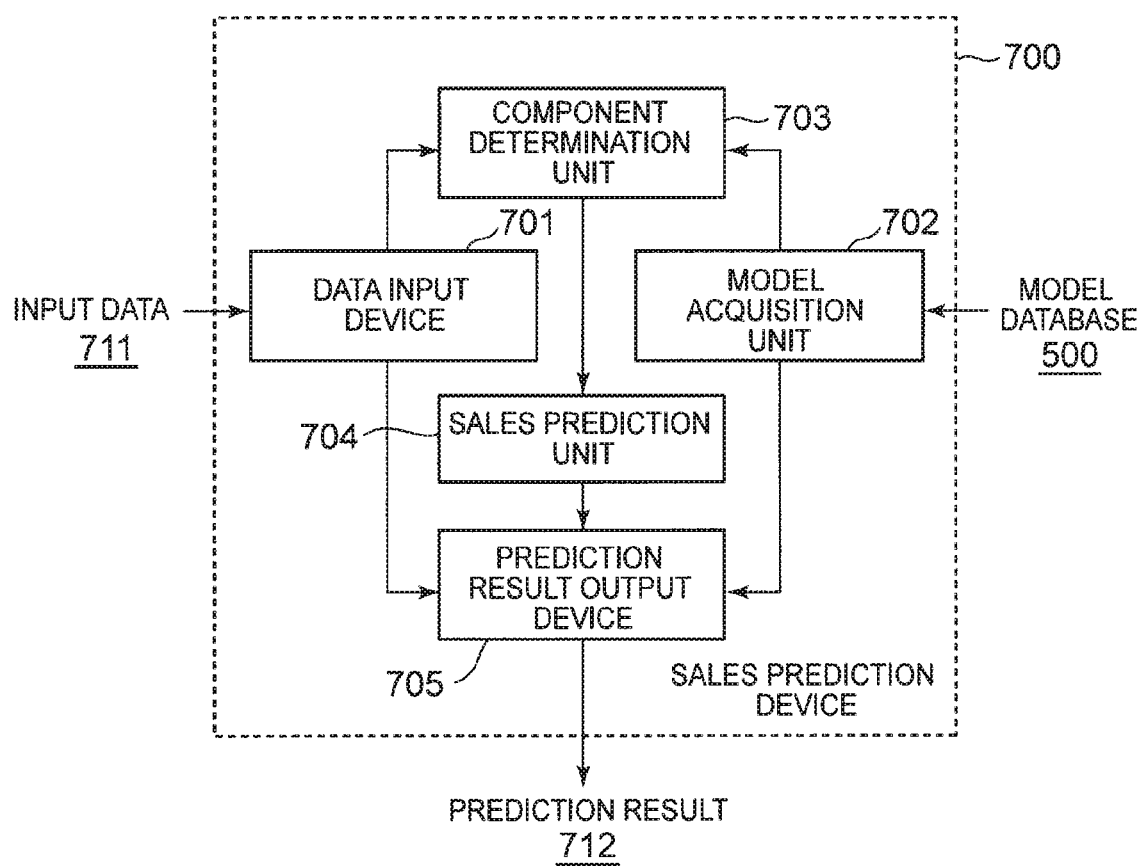
FIG. 9 is a block diagram showing a structure example of a sales prediction device according to at least one exemplary embodiment.

The sales prediction device of this exemplary embodiment will be described. FIG. 9 is a block diagram showing a structure example of the sales prediction device according to at least one exemplary embodiment. The sales prediction device 700 includes a data input device 701, a model acquisition unit 702, a component determination unit 703, a sales prediction unit 704, and a prediction result output device 705.

The data input device 701 inputs one or more explanatory variables which are information likely to affect the future sales as input data 711. The types of the explanatory variables constituting the input data 711 are the same types as the explanatory variables of the input data 111. In this exemplary embodiment, the data input device 701 is an example of the prediction data input unit.

The model acquisition unit 702 acquires gating functions or components from the model database 500 as models to be used for prediction of the sales. The gating functions are optimized by the gating function optimization unit 106. In addition, the components are optimized by the component optimization unit 105.

The component determination unit 703 traces the hierarchical latent structure, on the basis of the input data 711 input by the data input device 701 and the gating functions acquired by the model acquisition unit 702. The component determination unit 703 determines the components, which are associated with nodes of a lowest level of the hierarchical latent structure, to be the components to be used for prediction of the sales.

The sales prediction unit 704 predicts the sales by substituting the input data 711 input by the data input device 701 into the component determined by the component determination unit 703. The prediction result output device 705 outputs a prediction result 712 of the sales obtained by the sales prediction unit 706.

Figure 10:
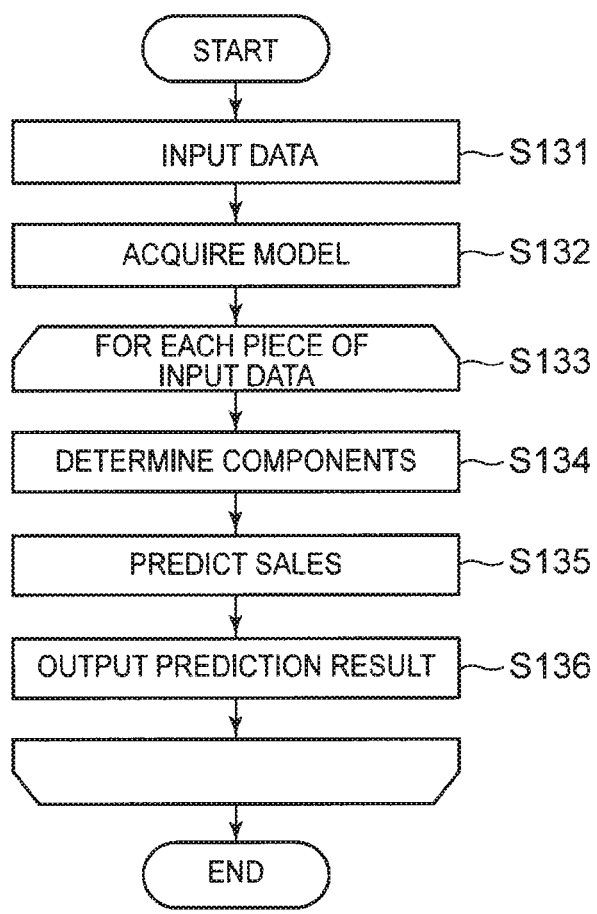
FIG. 10 is a flowchart showing an operation example of a sales prediction device according to at least one exemplary embodiment.

Next, an operation of the sales prediction device 700 of this exemplary embodiment will be described. FIG. 10 is a flowchart showing an operation example of the sales prediction device 700 according to at least one exemplary embodiment.

First, the data input device 701 inputs the input data 711 (step S131). The data input device 701 may input a plurality of pieces of input data 711, instead of one piece of input data 711. For example, the data input device 701 may input the input data 711 including the sales data for the most recent three months of a certain product, Twitter® data for the most recent three months, and TV metadata up to the previous day of the future prediction target day.

In a case where the data input device 701 inputs the plurality of pieces of input data 711, the sales prediction unit 704 predicts the sales of the target product for each piece of input data 711. Next, the model acquisition unit 702 acquires the gating functions and the components from the model database 500 (step S132).

Next, the sales prediction device 700 selects the input data 711 one by one, and executes processes from step S134 to step S136 described below for the selected input data 711 (step S133).

First, the component determination unit 703 determines components to be used for the prediction of the sales by tracing from the root node to the lowest-level node of the hierarchical latent structure, based on the gating functions acquired by the model acquisition unit 702 (step S134). Specifically, the component determination unit 703 determines the components with the following procedure.

The component determination unit 703 reads out the gating functions related to the node for each node of the hierarchical latent structure. Next, the component determination unit 703 determines whether or not the input data 711 satisfies the read-out gating functions. Then, the component determination unit 703 determines a next child node to trace, based on the determined result. When reaching the lowest-level node by tracing the node of the hierarchical latent structure by the processes, the component determination unit 703 determines the component related to the node to be the component to be used for the prediction of the sales.

If the component determination unit 703 determines the component to be used for the prediction of the sales in step S134, the sales prediction unit 704 predicts the sales of the target product by substituting the input data 711 selected in step S133 into the component (step S135). The prediction result output device 705 outputs the prediction result 712 of the sales obtained by the sales prediction unit 704 (step S136).

The sales prediction device 700 executes the processes from step S134 to step S136 for all pieces of input data 711 and finishes the process.

As described above, the sales prediction device 700 of this exemplary embodiment is able to predict the sales of the target product with excellent accuracy, by using the appropriate components by the gating functions. Particularly, since the gating functions and the components are estimated without losing theoretical justification by the hierarchical latent variable model estimation device 100, the sales prediction device 700 is able to predict the sales by using the components classified by the appropriate criterion.

Exemplary Embodiment 2

The following describes Exemplary Embodiment 2 of a sales prediction assistance system. A sales prediction assistance system according to this exemplary embodiment differs from the sales prediction assistance system 10 only in that the hierarchical latent variable model estimation device 100 is replaced with a hierarchical latent variable model estimation device 200.

Figure 11:
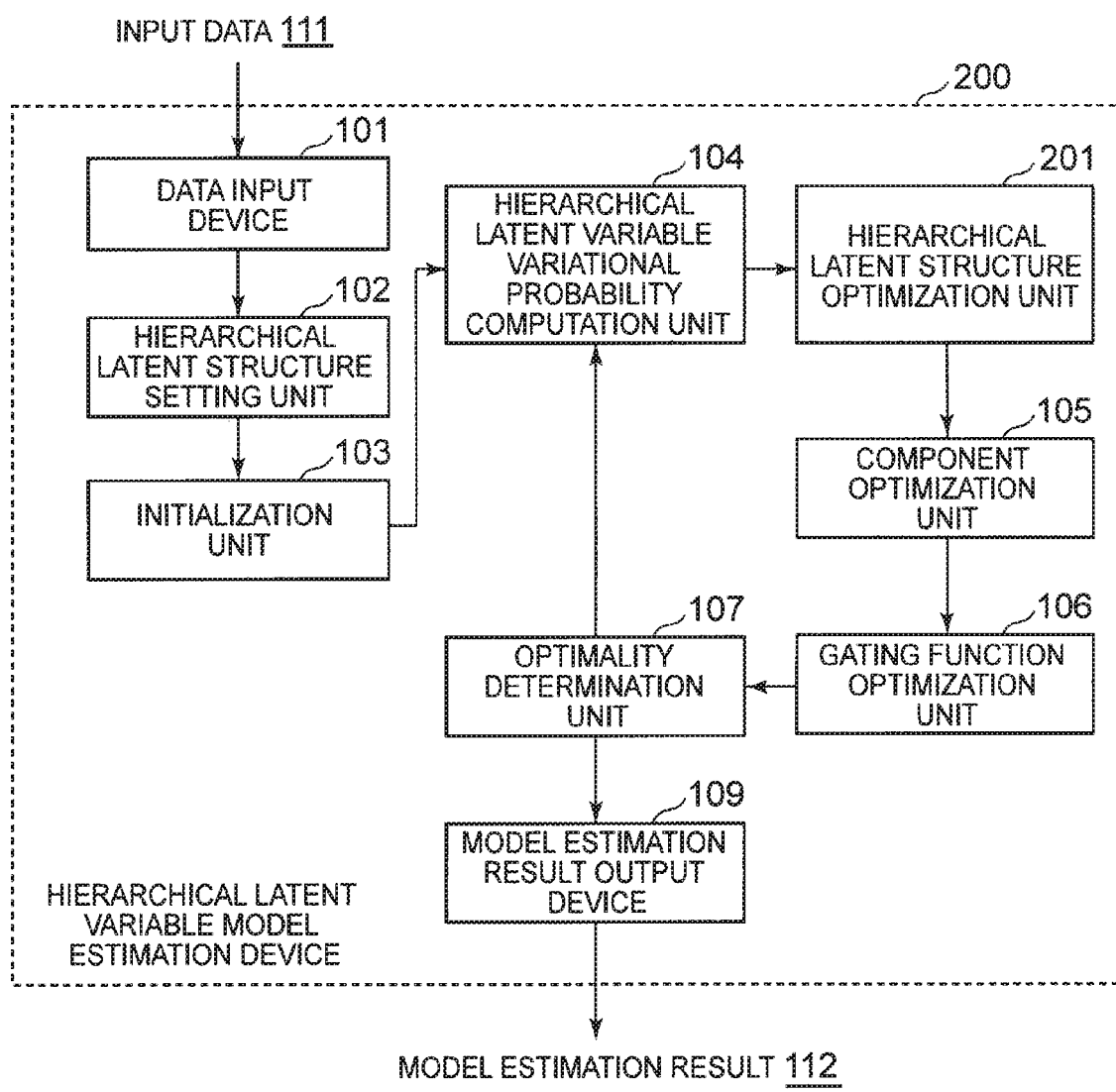
FIG. 11 is a block diagram showing a structure example of a hierarchical latent variable model estimation device according to at least one exemplary embodiment.

FIG. 11 is a block diagram showing a structure example of a hierarchical latent variable model estimation device according to at least one exemplary embodiment. The same components as those in Exemplary Embodiment 1 are given the same reference signs as in FIG. 3, and their description is omitted. A hierarchical latent variable model estimation device 200 of this exemplary embodiment differs from the hierarchical latent variable model estimation device 100 only in that a hierarchical latent structure optimization unit 201 is connected and the optimal model selection unit 108 is not connected.

In Exemplary Embodiment 1, the hierarchical latent variable model estimation device 100 optimizes the model of gating functions and components for the hierarchical latent structure candidate, and selects the hierarchical latent structure for optimizing the optimization criterion A. In the hierarchical latent variable model estimation device 200 in this exemplary embodiment, on the other hand, a process whereby the hierarchical latent structure optimization unit 201 removes a path having a reduced latent variable from the model is added after the process by the hierarchical latent variable variational probability computation unit 104.

Figure 12:
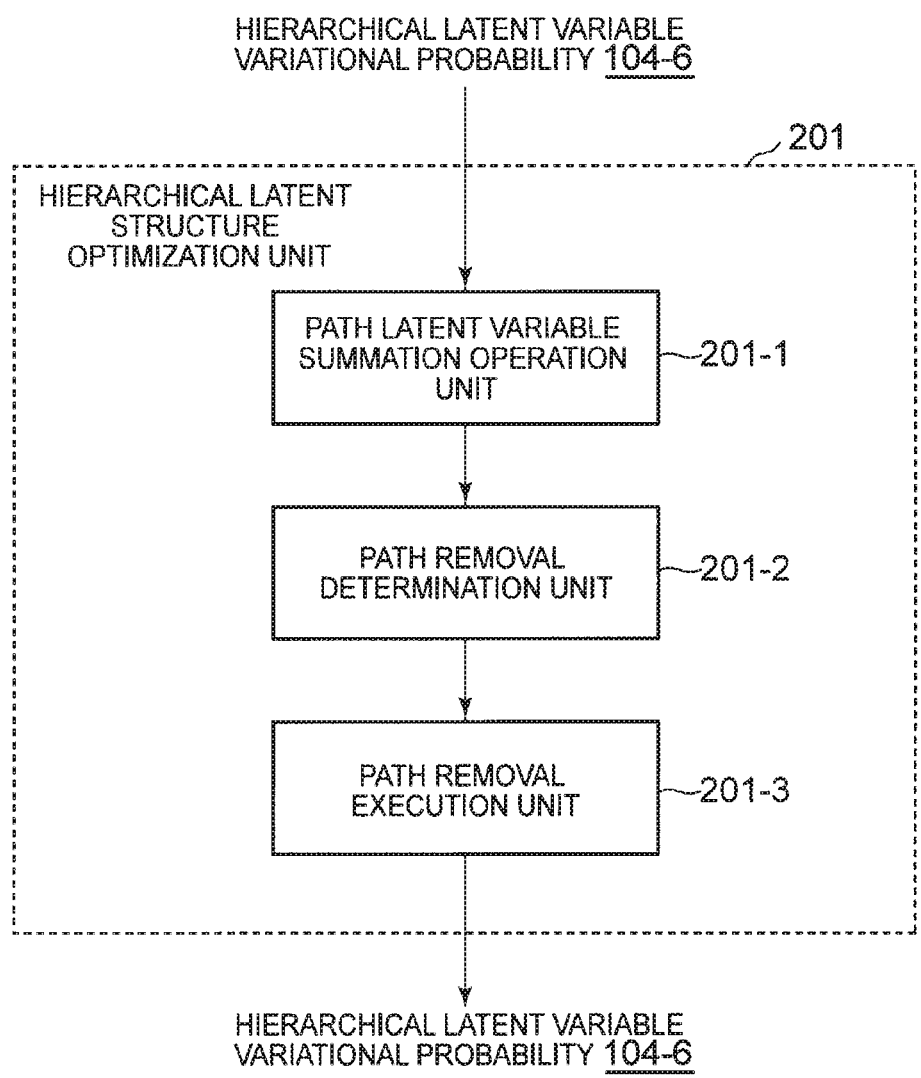
FIG. 12 is a block diagram showing a structure example of a hierarchical latent structure optimization unit according to at least one exemplary embodiment.

FIG. 12 is a block diagram showing a structure example of the hierarchical latent structure optimization unit 201 according to at least one exemplary embodiment 0125. The hierarchical latent structure optimization unit 201 includes a path latent variable summation operation unit 201-1, a path removal determination unit 201-2, and a path removal execution unit 201-3.

The path latent variable summation operation unit 201-1 receives input of the hierarchical latent variable variational probability 104-6, and computes the sum (hereafter referred to as "sample sum") of lowest-level path latent variable variational probabilities in each component.

The path removal determination unit 201-2 determines whether or not the sample sum is equal to or less than a predetermined threshold $\epsilon$. Here, $\epsilon$ is a threshold input together with the input data 111. In detail, the condition determined by the path removal determination unit 201-2 can be represented by, for example, the following Expression 5.

[Math. 5]

$$\sum_{n=1}^{N} q(z_{ij}^n) \le \epsilon \qquad \text{(Expression 5)}$$

That is, the path removal determination unit 201-2 determines whether or not the lowest-level path latent variable variational probability $q(z_{ij}^n)$ in each component satisfies the criterion defined by Expression 5 shown above. In other words, the path removal determination unit 201-2 determines whether or not the sample sum is sufficiently small.

The path removal execution unit 201-3 sets the variational probability of the path for which the sample sum is determined to be sufficiently small, to 0. The path removal execution unit 201-3 then re-computes the hierarchical latent variable variational probability 104-6 for each level using the lowest-level path latent variable variational probability normalized for each remaining path (i.e. path whose variational probability is not set to 0), and outputs the re-computation result.

The validity of this process is described below. Expression 6 shown below as an example is an update expression of $q(z_{ij}^n)$ in iterative optimization.

[Math. 6]

$$q^t(z_{ij}^n) \propto \qquad \text{(Expression 6)}$$

$$g_i^n g_{j|i}^n p(x^n \mid \phi_{ij}) \exp\left\{ \frac{-D_{\beta_i}}{2 \sum_{n=1}^{N} \sum_{j=1}^{K_2} q^{t-1}(z_{ij}^n)} + \frac{-D_{\phi_{ij}}}{2 \sum_{n=1}^{N} q^{t-1}(z_{ij}^n)} \right\}$$

In Expression 6 shown above, the negative term is included in the exponent part, and $q(z_{ij}'')$ computed in the preceding process is present in the denominator of the term. Accordingly, the value of optimized $q(z_{ij}'')$ is smaller when the denominator is smaller. Thus, a small path latent variable variational probability is gradually reduced through iterative computation.

Note that the hierarchical latent structure optimization unit 201 (more specifically, the path latent variable summation operation unit 201-1, the path removal determination unit 201-2, and the path removal execution unit 201-3) is realized by a CPU of a computer operating according to a program (hierarchical latent variable model estimation program).

Figure 13:
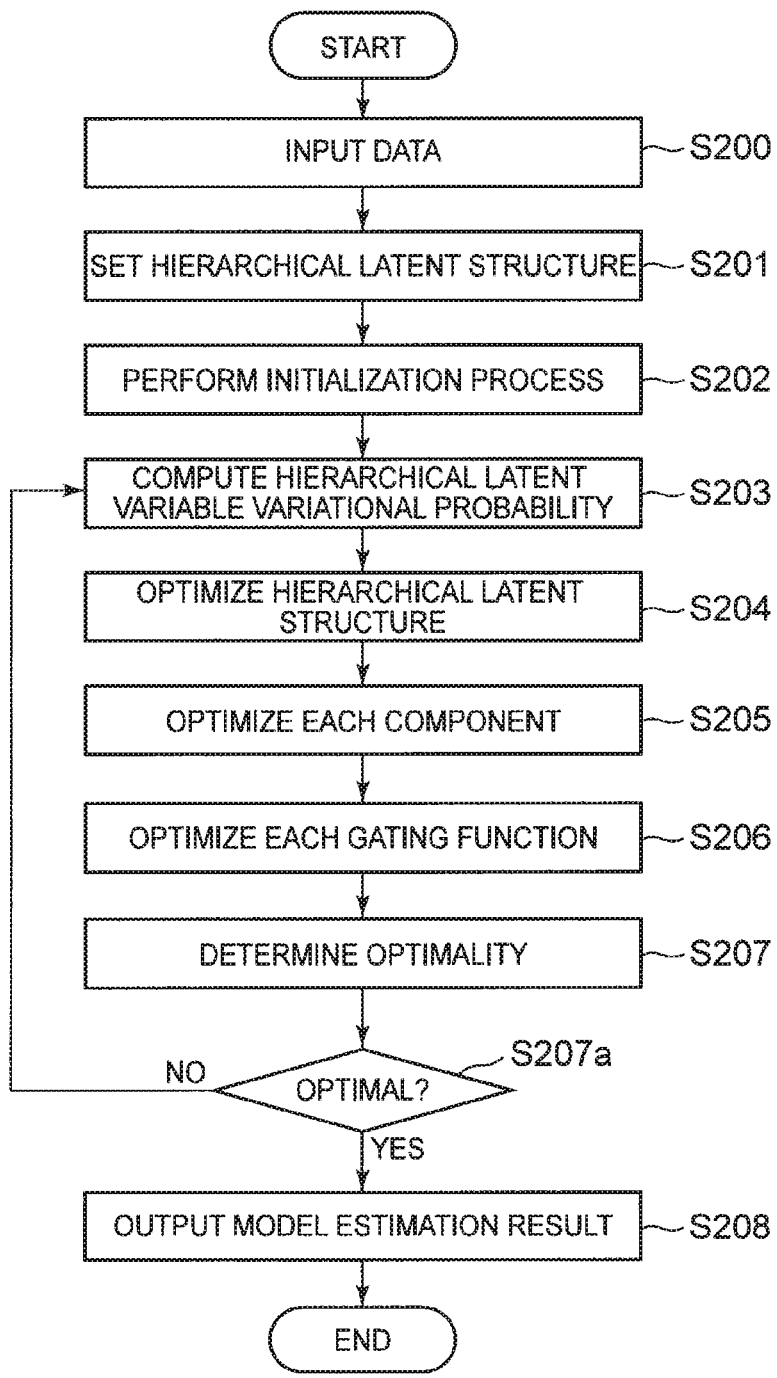
FIG. 13 is a flowchart showing an operation example of a hierarchical latent variable model estimation device according to at least one exemplary embodiment.

The following describes the operation of the hierarchical latent variable model estimation device 200 in this exemplary embodiment. FIG. 13 is a flowchart showing an operation example of the hierarchical latent variable model estimation device 200 according to at least one exemplary embodiment.

First, the data input device 101 inputs the input data 111 (step S200). Next, the hierarchical latent structure setting unit 102 sets an initial state of the number of hidden states as the hierarchical latent structure (step S201).

In Exemplary Embodiment 1, the plurality of candidates are all executed for the number of components to search for the optimal solution. In this exemplary embodiment, on the other hand, the number of components can be optimized, too, so that the hierarchical latent structure can be optimized in one operation. Therefore, in step S201, only the initial value of the number of hidden states needs to be set once, unlike step S102 in Exemplary Embodiment 1 where the candidate which has not been optimized is selected from the plurality of candidates.

Next, the initialization unit 103 performs the initialization process of the latent variable variational probability and the parameter used for estimation, for the set hierarchical latent structure (step S202).

Next, the hierarchical latent variable variational probability computation unit 104 computes the variational probability of each path latent variable (step S203). Next, the hierarchical latent structure optimization unit 201 optimizes the hierarchical latent structure by estimating the number of components (step S204). That is, since the components are located at the lowest-level nodes, when optimizing the hierarchical latent structure, the number of components is optimized, too.

Next, the component optimization unit 105 optimizes each component by estimating the type of observation probability and the parameter (step S205). Next, the gating function optimization unit 106 optimizes the branch parameter in each branch node (step S206). Next, the optimality determination unit 107 determines whether or not the optimization criterion A has converged (step S207). That is, the optimality determination unit 107 determines the optimality of the model.

In the case where, in step S207, it is not determined that the optimization criterion A has converged, i.e. it is determined that the model is not optimal (step S207*a*: No), the processes of steps S203 to S207 are repeated.

In the case where, in step S207, it is determined that the optimization criterion A has converged, i.e. it is determined that the model is optimal (step S207*a*: Yes), on the other hand, the model estimation result output device 109 outputs the model estimation result, and ends the process (step S208).

Figure 14:
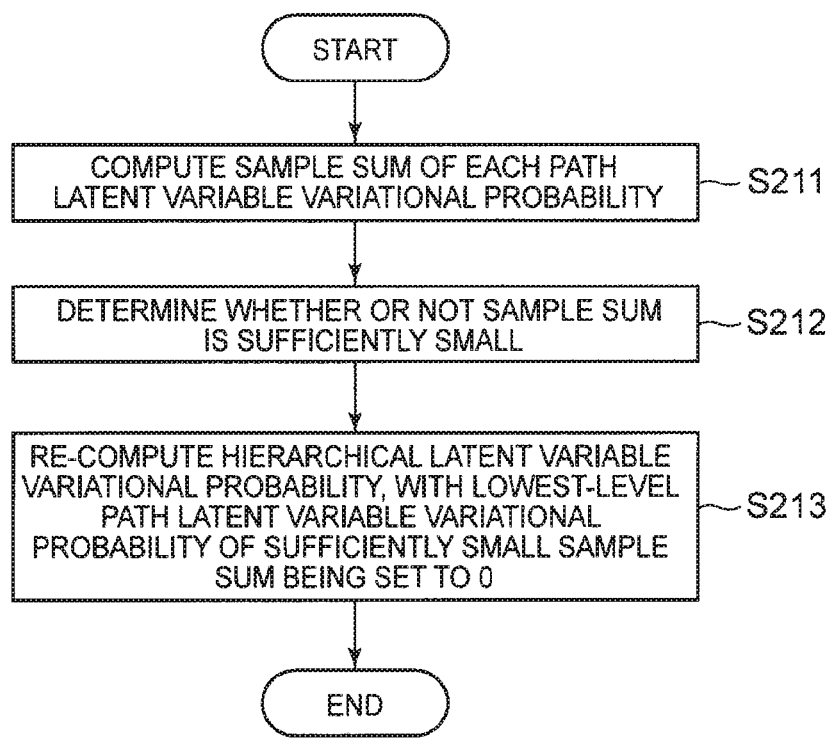
FIG. 14 is a flowchart showing an operation example of a hierarchical latent structure optimization unit according to at least one exemplary embodiment.

The following describes the operation of the hierarchical latent structure optimization unit 201 in this exemplary embodiment. FIG. 14 is a flowchart showing an operation example of the hierarchical latent structure optimization unit 201 according to at least one exemplary embodiment.

First, the path latent variable summation operation unit 201-1 computes the sample sum of path latent variables (step S211). Next, the path removal determination unit 201-2 determines whether or not the computed sample sum is sufficiently small (step S212). Next, the path removal execution unit 201-3 outputs the hierarchical latent variable variational probability re-computed in a state where the lowest-level path latent variable variational probability for which the sample sum is determined to be sufficiently small is set to 0, and ends the process (step S213).

As described above, in this exemplary embodiment, the hierarchical latent structure optimization unit 201 optimizes the hierarchical latent structure by removing, from the model, the path whose computed variational probability is equal to or less than the predetermined threshold.

According to such a structure, in addition to the advantageous effects of Exemplary Embodiment 1, the number of components can be optimized in one operation, with there being no need to optimize the plurality of hierarchical latent structure candidates as in the hierarchical latent variable model estimation device 100. This enables the number of components, the type and parameter of observation probability, and the variational distribution to be estimated simultaneously, so that computation costs can be reduced.

Exemplary Embodiment 3

The following describes Exemplary Embodiment 3 of the sales prediction assistance system. The sales prediction assistance system according to this exemplary embodiment differs from the exemplary embodiment 2 in the configuration of the hierarchical latent variable model estimation device. The hierarchical latent variable model estimation device in this exemplary embodiment differs from the hierarchical latent variable model estimation device 200 only in that the gating function optimization unit 106 is replaced by a gating function optimization unit 113.

Figure 15:
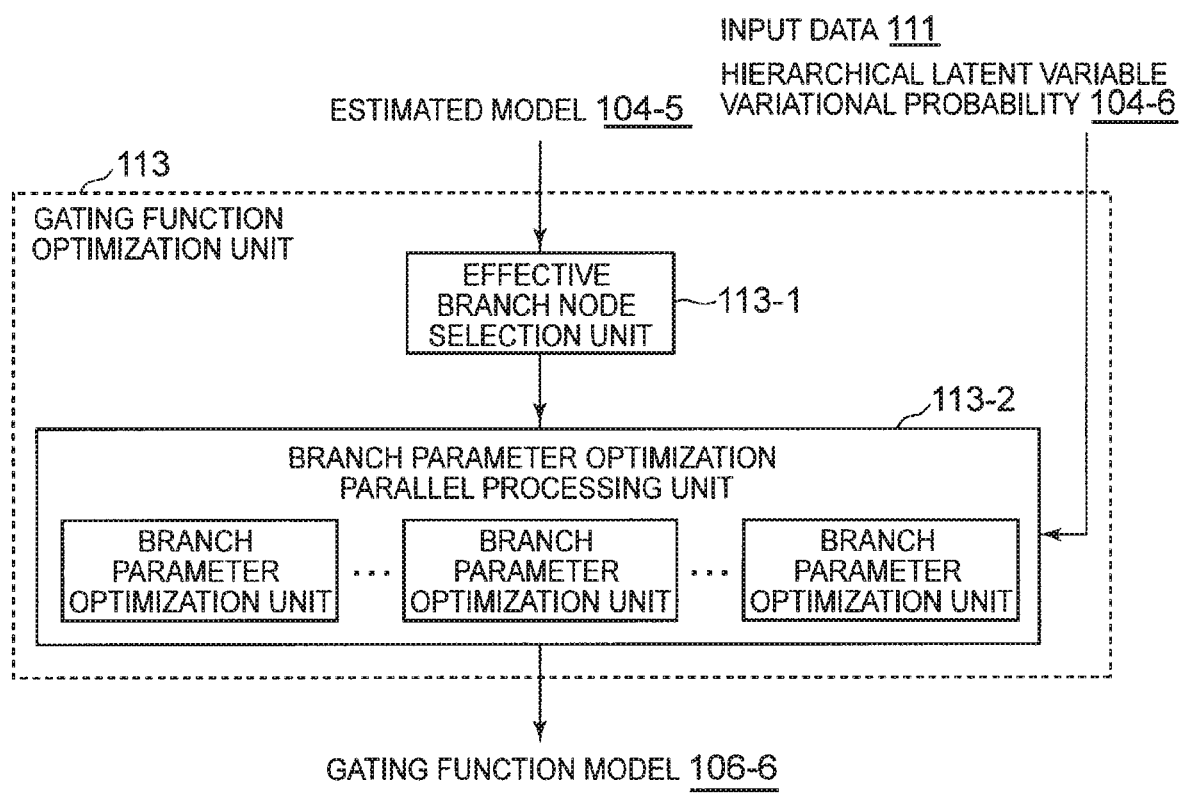
FIG. 15 is a block diagram showing a structure example of a gating functions optimization unit of Exemplary Embodiment 3.

FIG. 15 is a block diagram showing a structure example of the gating function optimization unit 113 in Exemplary Embodiment 3. The gating function optimization unit 113 includes an effective branch node selection unit 113-1 and a branch parameter optimization parallel processing unit 113-2.

The effective branch node selection unit 113-1 selects only effective branch nodes from the hierarchical latent structure. In detail, through the use of the model 104-5 estimated by the component optimization unit 105, the effective branch node selection unit 113-1 selects only the effective branch nodes by taking into account the path removed from the model. Thus, an effective branch node means a branch node on a path not removed from the hierarchical latent structure.

The branch parameter optimization parallel processing unit 113-2 performs the branch parameter optimization process for the effective branch nodes in parallel, and outputs the gating function model 106-6. In detail, the branch parameter optimization parallel processing unit 113-2 optimizes the branch parameters for all effective branch nodes simultaneously in parallel, using the input data 111 and the hierarchical latent variable variational probability 104-6 computed by the hierarchical latent variable variational probability computation unit 104.

For instance, the branch parameter optimization parallel processing unit 113-2 may include the branch parameter optimization units 106-3 in Exemplary Embodiment 1 arranged in parallel, as exemplified in FIG. 11. Such a structure allows the branch parameters of all gating functions to be optimized at one time.

That is, while the hierarchical latent variable model estimation devices 100 and 200 execute the optimization process of the gating functions one at a time, the hierarchical latent variable model estimation device in this exemplary embodiment can execute the optimization process of the gating functions in parallel, which contributes to faster model estimation.

Note that the gating function optimization unit 113 (more specifically, the effective branch node selection unit 113-1 and the branch parameter optimization parallel processing unit 113-2) is realized by a CPU of a computer operating according to a program (hierarchical latent variable model estimation program).

Figure 16:
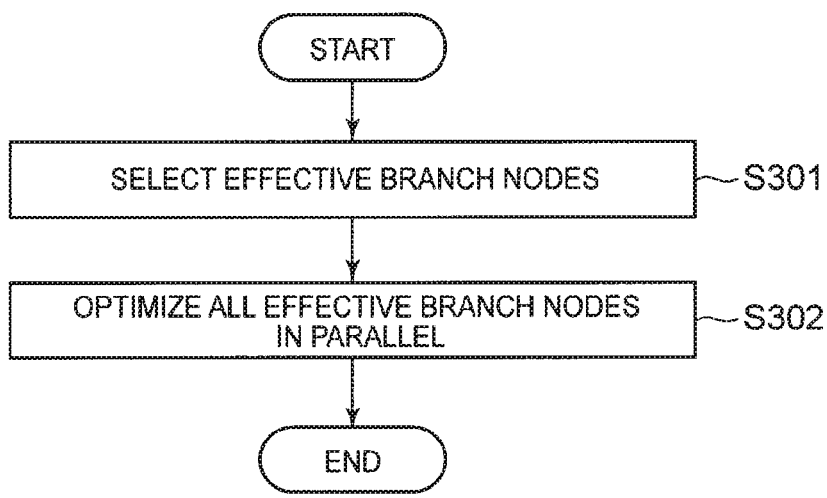
FIG. 16 is a flowchart showing an operation example of a gating functions optimization unit according to at least one exemplary embodiment.

The following describes the operation of the gating function optimization unit 113 in this exemplary embodiment. FIG. 16 is a flowchart showing an operation example of the gating function optimization unit 113 according to at least one exemplary embodiment. First, the effective branch node selection unit 113-1 selects all effective branch nodes (step S301). Next, the branch parameter optimization parallel processing unit 113-2 optimizes all effective branch nodes in parallel (step S302), and ends the process (step S302).

As described above, according to this exemplary embodiment, the effective branch node selection unit 113-1 selects the effective branch nodes from the hierarchical latent structure nodes, and the branch parameter optimization parallel processing unit 113-2 optimizes the gating function model on the basis of the variational probability of the latent variable in each effective branch node. Here, the branch parameter optimization parallel processing unit 113-2 optimizes the branch parameters for the effective branch nodes in parallel. Thus, the optimization process of the gating functions can be performed in parallel, so that faster model estimation can be achieved in addition to the advantageous effects of the foregoing exemplary embodiments.

Exemplary Embodiment 4

Next, Exemplary Embodiment 4 of the present invention will be described. A sales prediction assistance system according to Exemplary Embodiment 4 predicts the sales based on a CM implementation plan. Specifically, the sales prediction assistance system predicts the sales appropriate to a CM implementation plan (hereinafter, referred to as "exposure pattern" in some cases) determined based on a CM budget, a CM price list, or the like. The sales prediction device 800 included in the sales prediction assistance system according to Exemplary Embodiment 4 is an example of a CM planning assistance system.

Figure 17:
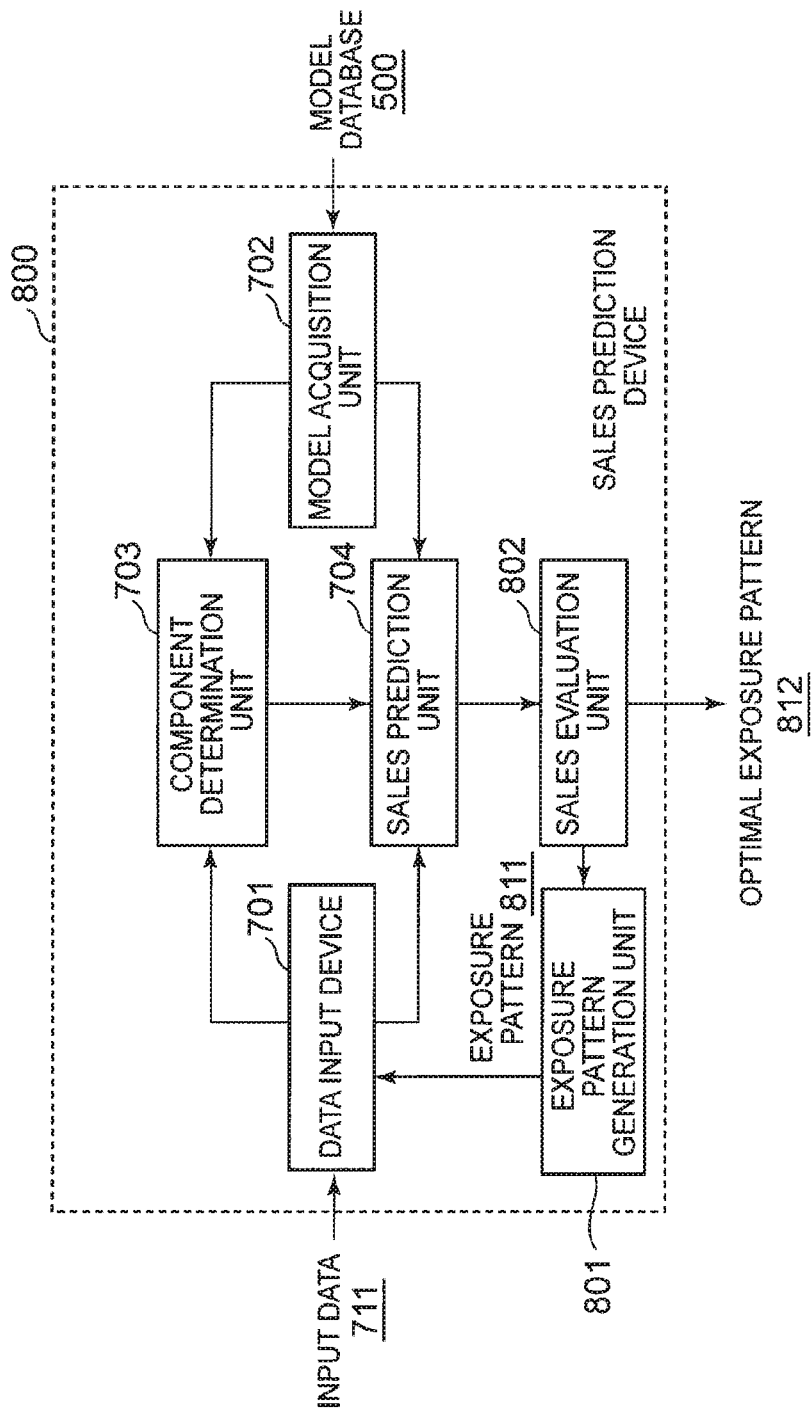
FIG. 17 is a block diagram showing a structure example of a sales prediction device according to at least one exemplary embodiment.

FIG. 17 is a block diagram showing a structure example of a sales prediction device according to at least one exemplary embodiment. The sales prediction assistance system according to this exemplary embodiment differs from the sales prediction assistance system 10 in that the sales prediction device 700 is replaced with the sales prediction device 800.

The ales prediction device 800 includes an exposure pattern generation unit 801, a sales evaluation unit 802, a data input device 701, a model acquisition unit 702, a component determination unit 703, and a sales prediction unit 704. It should be noted that the model acquisition unit 702 and the component determination unit 703 of this exemplary embodiment differ from the model acquisition unit 702 and the component determination unit 703 of Exemplary Embodiment 1 in operations. The operation of the data input device 701 is the same as that of Exemplary Embodiment 1.

The exposure pattern generation unit 801, the sales evaluation unit 802, the data input device 701, the model acquisition unit 702, the component determination unit 703, and the sales prediction unit 704 are implemented by the CPU of a computer operating according to a program (CM planning assistance program). The exposure pattern generation unit 801, the sales evaluation unit 802, the data input device 701, the model acquisition unit 702, the component determination unit 703, and the sales prediction unit 704 may be each implemented by dedicated hardware.

The model acquisition unit 702 acquires gating functions and components from the model database 500 as a model used for sales prediction in the same manner as the model acquisition unit 702 of Exemplary Embodiment 1. Furthermore, the model acquisition unit 702 of this exemplary embodiment may visualize and display the contents of the acquired gating functions and components.

Figure 18:
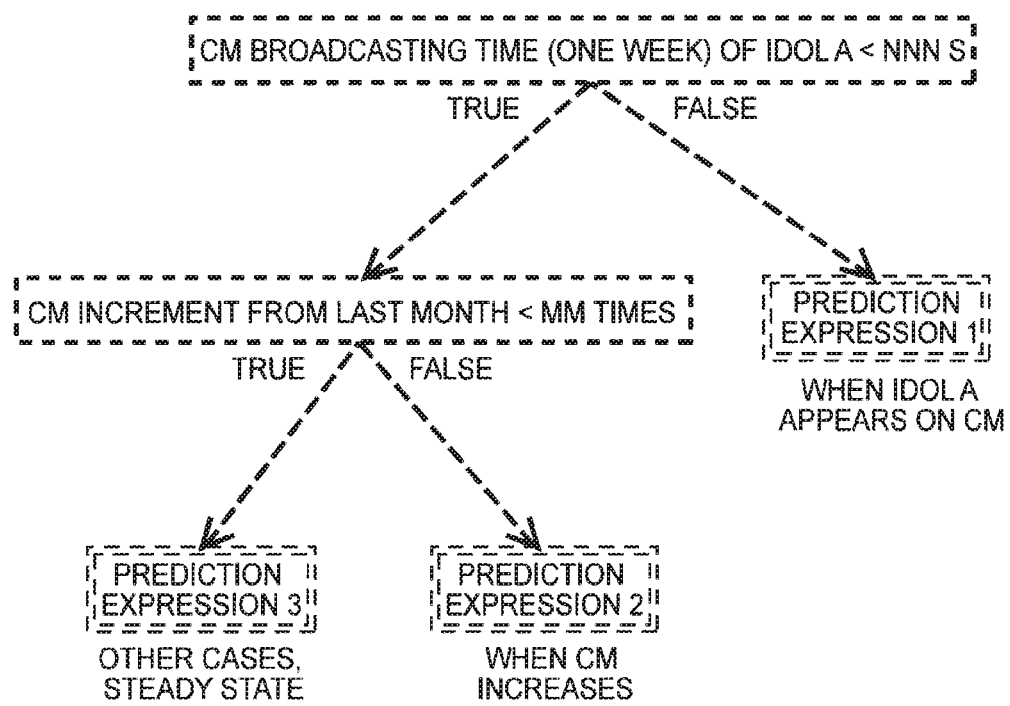
FIG. 18 is an explanatory diagram showing an example of a visualized model.

FIG. 18 is an explanatory diagram showing an example of a visualized model. As described above, a hierarchical latent variable model is represented by a tree structure in this specification. Therefore, the model acquisition unit 702 may display the components (or identification information of the components) in the root node and display condition (or identification information of the condition) indicated by the gating function corresponding to the higher node.

Three prediction expressions are arranged in the root node in the example shown in FIG. 18, and the example shows that the gating function corresponding to the node branching into a prediction expression 2 and a prediction expression 3 causes the branch into the prediction expressions under the condition "CM increment from the last month <MM times."

The exposure pattern generation unit 801 generates an exposure pattern 811 on the basis of information used in discussing the CM to be performed (for example, a CM budget, a CM price list, CM attribute data, etc.) and inputs the information as prediction data into the data input device 701.

The exposure pattern 811 input here is future schedule data representing the content of the CM scheduled to be performed during a period from predicted time to prediction target time. Specifically, the exposure pattern 811 generated here is an explanatory variable indicating future schedule data and differs in property from performance data, which is able to be acquired until the predicted time. Additionally, the model database 500 stores a sales prediction model learned based on a past exposure pattern. The exposure pattern 811 is modifiable schedule data and differs in property from data, which cannot be intentionally modified in schedule such as weather forecasting.

In this exemplary embodiment, future schedule data, which is implemented from the predicted day to the prediction target day, is used as an explanatory variable, as information likely to affect the future sales prediction. The use of the explanatory variable enables improvement of the accuracy of the sales prediction.

The method in which the exposure pattern generation unit 801 generates the exposure pattern 811 is arbitrary. The exposure pattern generation unit 801 may generate the exposure pattern 811 by comprehensively changing items other than the required items (for example, a period, a time zone, etc.) within the CM budget, for example.

Moreover, the exposure pattern generation unit 801 may generate an exposure pattern 811 that emphasizes an explanatory variable likely to affect the sales more heavily. Specifically, the exposure pattern generation unit 801 may receive the explanatory variable likely to affect the sales more heavily from the component determination unit 703 described later and may generate an exposure pattern 811 in which a heavy emphasis is placed on the explanatory variable. The generation of the exposure pattern enables the generation of a CM implementation plan where an increase in sales is predicted.

The data input device 701 inputs the input data 711 and the exposure pattern 811 as prediction data into the component determination unit 703.

The component determination unit 703 traces the hierarchical latent structure in the same manner as Exemplary Embodiment 1 on the basis of the input data 711 and the exposure pattern 811 and of the gating functions acquired by the model acquisition unit 702. The component determination unit 703 then determines the component associated with the node of the lowest level of the hierarchical latent structure to be a component used for predicting the sales.

Furthermore, the component determination unit 703 of this exemplary embodiment may output the content of the determined component. Specifically, the component determination unit 703 may visualize the higher explanatory variable likely to affect the sales more heavily.

Since a component is a value indicating a weight related to each explanatory variable, the component used for predicting the sales can be represented by a linear expression of each explanatory variable as exemplified in the following Expression B, for example.

$$y = a_0 + a_1 x_1 + a_2 x_2 \cdots a_n x_n \quad \text{(Expression B)}$$

Here, y is a response variable indicating future sales and $x_i$ is an explanatory variable. In addition, $a_i$ indicates a weight on each explanatory variable $x_i$.

The component determination unit 703 may output the content of an explanatory variable affecting the sales more heavily among the explanatory variables used for predicting the sales. The component determination unit 703 may output an explanatory variable having a larger weight value, for example. Furthermore, the component determination unit 703 may adjust the weight value according to a range in which each explanatory variable can be used and output an explanatory variable having a larger weight value after the adjustment.

Figure 19:
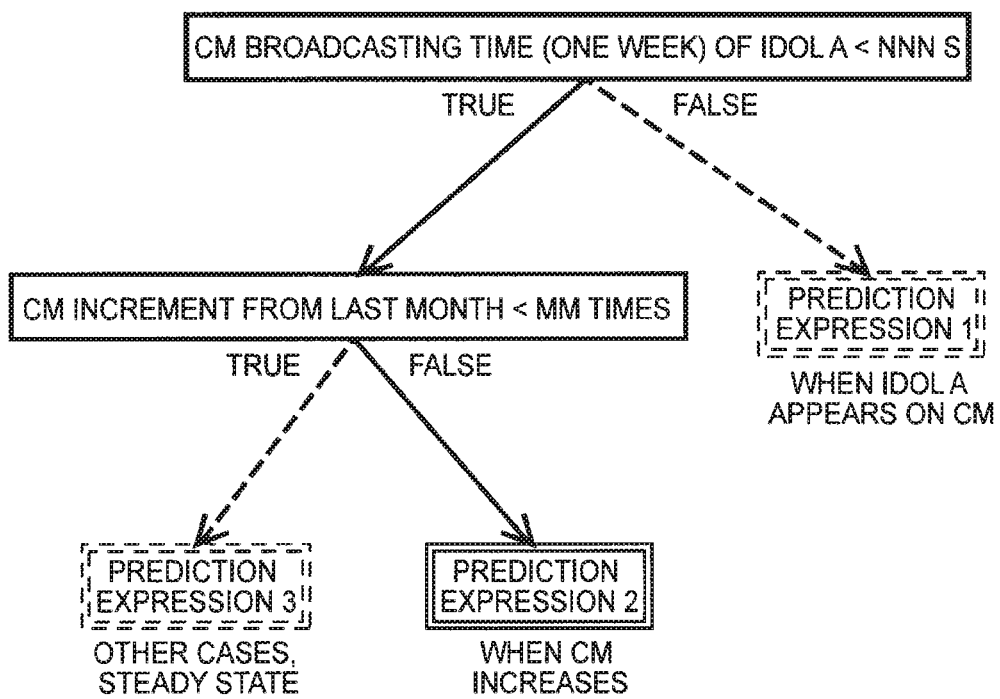
FIG. 19 is an explanatory diagram showing an example of a visualized content of a determined component.

FIG. 19 is an explanatory diagram showing an example of a visualized content of a determined component. In the example shown in FIG. 19, an explanatory variable (effective factor) likely to affect the sales more heavily and the weight thereof is output in addition to the sales together with the hierarchical structure.

Furthermore, as exemplified in FIG. 19, the component determination unit 703 may output a branch condition indicated by the gating function of the hierarchical latent structure together with the hierarchical structure. Furthermore, the branch condition may be displayed in response to an operation of a pointing device (for example, an operation such as clicking with a mouse).

Furthermore, instead of the model acquisition unit 702, the component determination unit 703 may visualize and display the contents of the acquired gating functions and components.

As described above, in this exemplary embodiment, the prediction expression of the response variable acquired by the component determination unit 703 is able to be represented in the form of Expression B exemplified in the above, for example, and therefore it is not a so-called black-boxed expression, but has an advantage in terms of interpretability. Therefore, an explanatory variable affecting the sales of a target product can be output at low cost.

The sales prediction unit 704 predicts sales on the basis of the component determined by the component determination unit 703 and of the input data 711 and the exposure pattern 811.

The sales evaluation unit 802 evaluates the predicted sales. Specifically, if the sales based on an exposure pattern predicted anew is greater than sales based on the exposure pattern predicted in the previous time, the sales evaluation unit 802 retains the exposure pattern in a memory (not shown). The sales evaluation unit 802 then repeats the evaluation until a previously determined condition is satisfied (for example, an increment of the sales is lower than a certain threshold value, the number of prediction times reaches a predetermined number of times, the prediction time runs beyond a predetermined period, or the like). Thereafter, the sales evaluation unit 802 outputs the exposure pattern stored in the memory as an optimal exposure pattern.

In this manner, the sales evaluation unit 802 may instruct the exposure pattern generation unit 801 to generate a new exposure pattern until the prediction by the sales prediction unit 704 or an increment of the predicted sales satisfies a predetermined condition. It can be said that a simulation for CM optimization is performed by the linkage between the exposure pattern generation unit 801 and the sales evaluation unit 802 performed in this manner.

Next, the operation of the sales prediction system of this exemplary embodiment will be described.

First, the hierarchical latent variable model estimation device 100 estimates the gating functions and components for predicting the sales of a target product. In this exemplary embodiment, the hierarchical latent variable model estimation device 100 estimates the gating functions and components for each target product. In this exemplary embodiment, the hierarchical latent variable model estimation device 100 computes the gating functions and components in a method described in Exemplary Embodiment 1. In other exemplary embodiments, the hierarchical latent variable model estimation device 100 may compute the gating functions and components in the method described in Exemplary Embodiment 2 or the method described in Exemplary Embodiment 3.

The hierarchical latent variable model estimation device 100 records the estimated gating functions and components in the model database 500. In response to the recording of the gating functions and components in the model database 500, the sales prediction device 800 starts the sales prediction.

Figure 20:
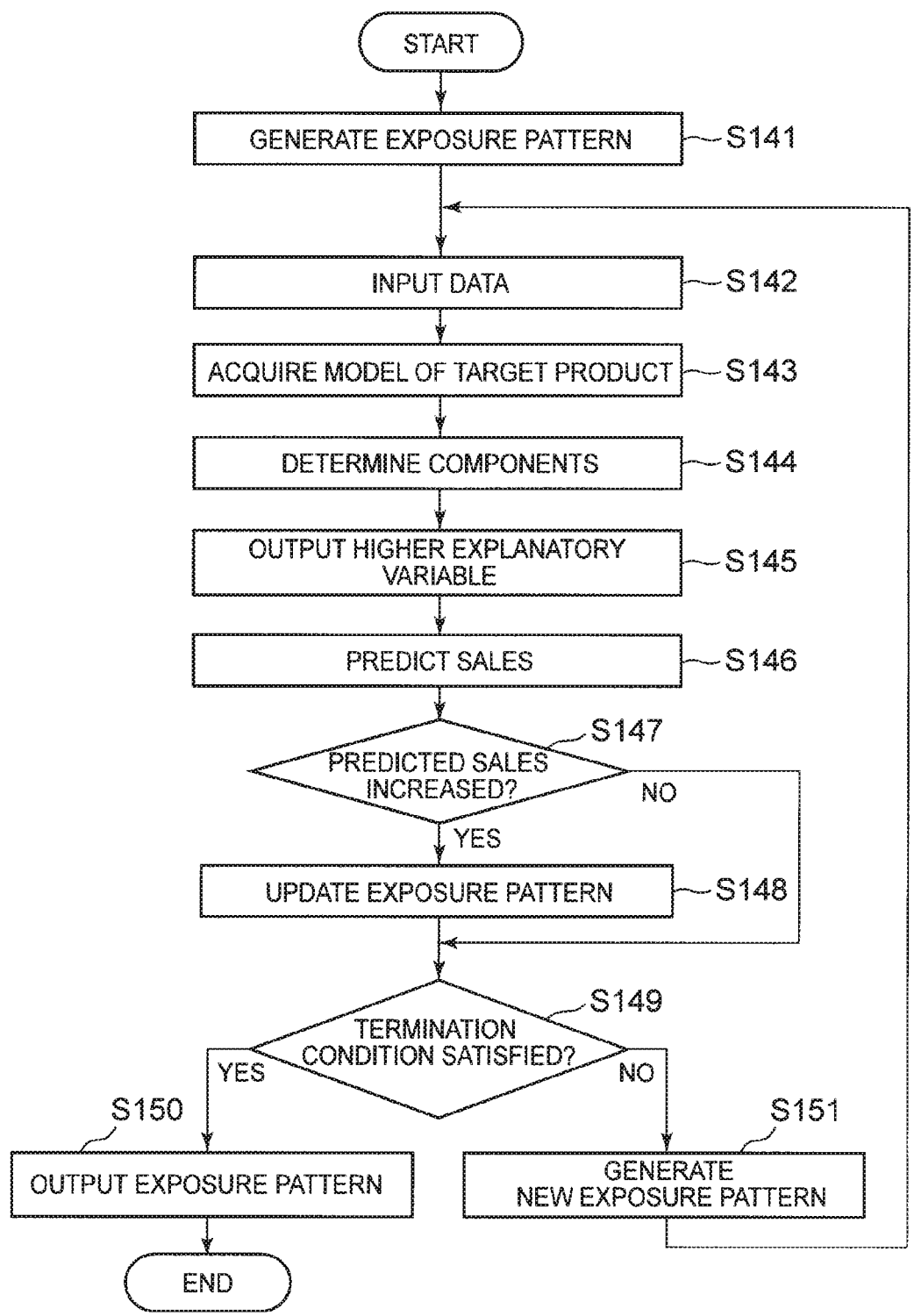
FIG. 20 is a flowchart showing an operation example of a sales prediction device according to at least one exemplary embodiment.

FIG. 20 is a flowchart showing an operation example of a sales prediction device according to at least one exemplary embodiment.

The exposure pattern generation unit 801 of the sales prediction device 800 generates an exposure pattern 811 (step S141). Specifically, the exposure pattern generation unit 801 generates TV metadata (CM implementation plan) in a period from a predicted day to the previous day of a future prediction target day. Next, the data input device 701 inputs the input data 711 and the exposure pattern 811 (step S142). Specifically, the data input device 701 inputs the most recent sales data and the most recent Twitter® data of a target product as the input data 711. Hereinafter, the input data 711 and the exposure pattern 811 will be collectively referred to simply as "input data 711."

The model acquisition unit 702 acquires the gating functions and components of a target product from the model database 500 (step S143). Next, the component determination unit 703 determines the components used for predicting the sales by tracing from the root node to the node of the lowest level of the hierarchical latent structure on the basis of the input data 711 and the gating functions acquired by the model acquisition unit 702 (step S144). Moreover, the component determination unit 703 outputs a higher explanatory variable likely to affect the sales more heavily on the basis of the determined components (step S145).

Upon the determination of the component used for predicting the sales by the component determination unit 703, the sales prediction unit 704 predicts the sales of the target product by substituting the input data 711 selected in step S143 into the component (step S146).

The sales evaluation unit 802 evaluates the predicted sales. Specifically, the sales evaluation unit 802 determines whether or not the sales predicted anew is greater than the previously-predicted sales (step S147). If the sales predicted anew has increased (step S147: Yes), the sales evaluation unit 802 updates the retained exposure pattern 811 (step S148). On the other hand, unless the sales has increased (step S147: No), the sales evaluation unit 802 performs the processes of step S149 and subsequent steps.

Next, the sales evaluation unit 802 determines whether or not the termination condition of the prediction process is satisfied (step S149). If the termination condition is satisfied (step S149: Yes), the sales evaluation unit 802 outputs the retained exposure pattern as an optimal exposure pattern (step S150). On the other hand, unless the termination condition is satisfied (step S149: No), the exposure pattern generation unit 801 generates a new exposure pattern on the basis of the explanatory variable output by the component determination unit 703 (step S151) and the processes of step S142 and subsequent steps are repeated.

As described above, in the sales prediction device 800 of this exemplary embodiment, the component determination unit 703 determines the component identified from the hierarchical latent structure on the basis of the input data, which is prediction data, and the exposure pattern, and the sales prediction unit 704 predicts the sales by using the determined component. Therefore, it is possible to predict the sales with accuracy and to easily identify a factor likely to affect the sales more heavily.

Although the sales evaluation unit 802 retains one optimal exposure pattern and outputs the exposure pattern in this exemplary embodiment, the sales evaluation unit 802 may retain a plurality of exposure patterns together with the sales prediction. In addition, the sales evaluation unit 802 may output exposure patterns higher in the sales prediction.

Basic Configuration

Figure 21:
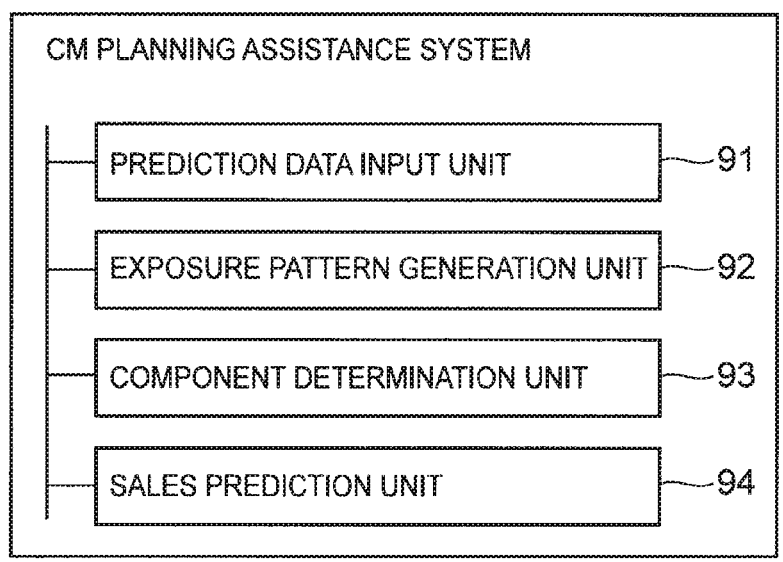
FIG. 21 is a block diagram showing a basic configuration of a CM planning assistance system.

Next, the basic configuration of the CM planning assistance system will be described. FIG. 21 is a block diagram showing the basic configuration of the CM planning assistance system. The CM planning assistance system includes a prediction data input unit 91, an exposure pattern generation unit 92, a component determination unit 93, and a sales prediction unit 94

The prediction data input unit 91 inputs prediction data that is one or more explanatory variables that are information likely to affect future sales. The prediction data input unit 91 includes the data input device 701 as an example.

The exposure pattern generation unit 92 generates an exposure pattern which is an explanatory variable indicating the content of the CM scheduled to be performed during a period from the predicted time to the future prediction target time. The exposure pattern generation unit 92 includes the exposure pattern generation unit 801 as an example.

The component determination unit 93 determines the component used for predicting the sales on the basis of a hierarchical latent structure that is a structure in which latent variables are represented by a tree structure and components representing probability models are located at nodes of a lowest level of the tree structure, gating functions for determining a branch direction in the nodes of the hierarchical latent structure, and the prediction data and the exposure pattern. The component determination unit 93 includes the component determination unit 703 as an example.

The sales prediction unit 94 predicts the sales on the basis of the component determined by the component determination unit 93 and the prediction data and exposure pattern. The sales prediction unit 94 includes the sales prediction unit 704 as an example.

According to the above configuration, the CM planning assistance system is able to perform an appropriate sales prediction based on a CM plan at low cost by using the appropriate component through the gating function.

Moreover, the component determination unit 93 may output an explanatory variable likely to affect the sales more heavily. According to this configuration, it is possible to compile a CM plan that emphasizes a factor likely to affect the sales more heavily.

The exposure pattern generation unit 92 may generate an exposure pattern in which a heavy emphasis is placed on the output explanatory variable. According to this configuration, it is possible to automatically generate a CM plan affecting the sales more heavily.

Additionally, the CM planning assistance system may have an sales evaluation unit which evaluates the predicted sales. The sales evaluation unit includes the sales evaluation unit 802 as an example. Furthermore, the sales evaluation unit may instruct the exposure pattern generation unit 92 to generate a new exposure pattern until the prediction process performed by the sales prediction unit 94 or an increment of the predicted sales satisfies a predetermined condition. According to the configuration, an optimal CM plan can be automatically created.

Moreover, the component determination unit 93 may output an explanatory variable likely to affect the sales more heavily together with the hierarchical latent structure. Furthermore, the component determination unit 93 may output a branch condition indicated by the gating function of the hierarchical latent structure.

Figure 22:
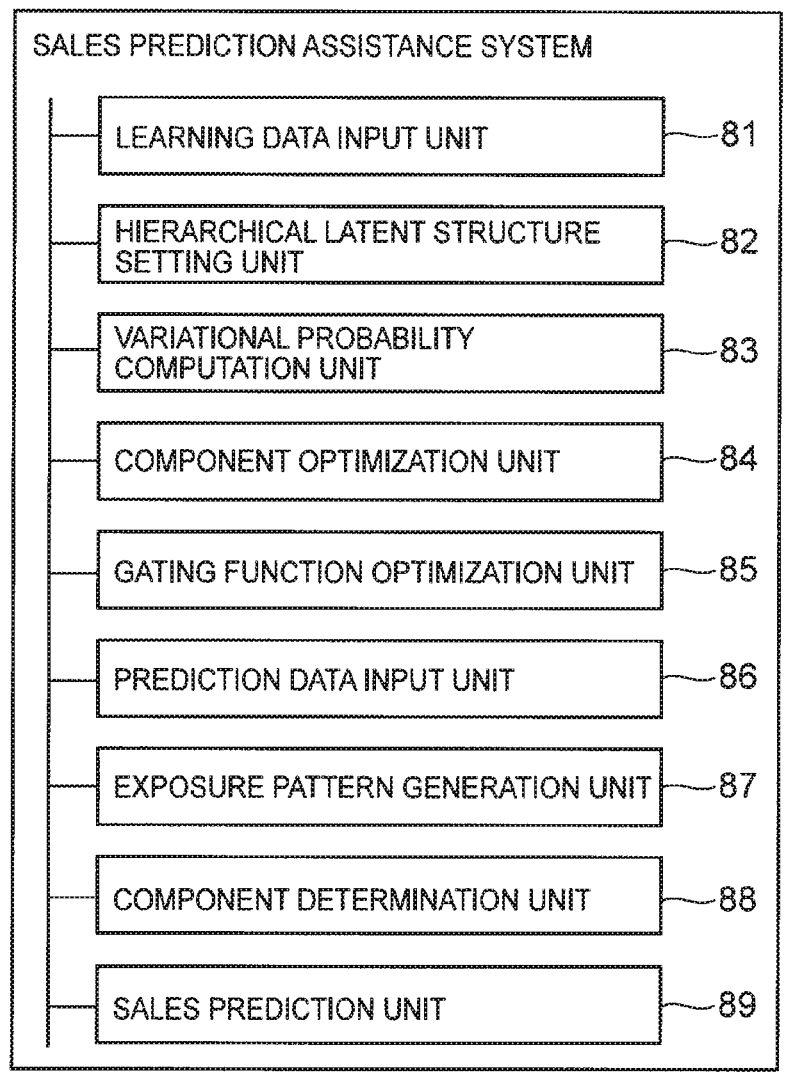
FIG. 22 is a block diagram showing a basic configuration of a sales prediction assistance system.

The following describes the basic configuration of the sales prediction assistance system. FIG. 22 is a block diagram showing the basic configuration of the sales prediction assistance system. The sales prediction assistance system includes: a learning data input unit 81 (e.g. the data input device 101) for inputting learning data which is a plurality of combinations of a response variable indicating future sales and one or more explanatory variables which are information likely to affect the sales; a hierarchical latent structure setting unit 82 (e.g. the hierarchical latent structure setting unit 102) for setting a hierarchical latent structure that is a structure in which latent variables are represented by a tree structure and components representing probability models are located at nodes of a lowest level of the tree structure; a variational probability computation unit 83 (e.g. the hierarchical latent variable variational probability computation unit 104) for computing a variational probability of a path latent variable that is a latent variable included in a path linking a root node to a target node in the hierarchical latent structure, on the basis of the learning data input by the learning data input unit 81 and the components; a component optimization unit 84 (e.g. the component optimization unit 105) for optimizing the components for the computed variational probability, on the basis of the learning data input by the learning data input unit 81; a gating function optimization unit 85 (e.g. the gating function optimization unit 106) for optimizing a gating function model that is a model for determining a branch direction according to the explanatory variable in a node of the hierarchical latent structure, on the basis of the variational probability of the latent variable in the node; a prediction data input unit 86 (e.g. the data input device 701) for inputting one or more explanatory variables as prediction data; an exposure pattern generation unit 87 (e.g. the exposure pattern generation unit 801) for generating an exposure pattern which is an explanatory variable indicating the content of a CM scheduled to be performed during a period from predicted time to future prediction target time; a component determination unit 88 (e.g. the component determination unit 703) for determining the component used for predicting the sales among the components optimized by the component optimization unit 84, on the basis of the gating functions optimized by the gating function optimization unit 85 and of the prediction data and the exposure pattern; and a sales prediction unit 89 (e.g. the sales prediction unit 704) for predicting the sales, on the basis of the component determined by the component determination unit 88 and of the prediction data and the exposure pattern.

According to the above configuration, the sales of the target product can be predicted while suppressing the cost.

Figure 23:
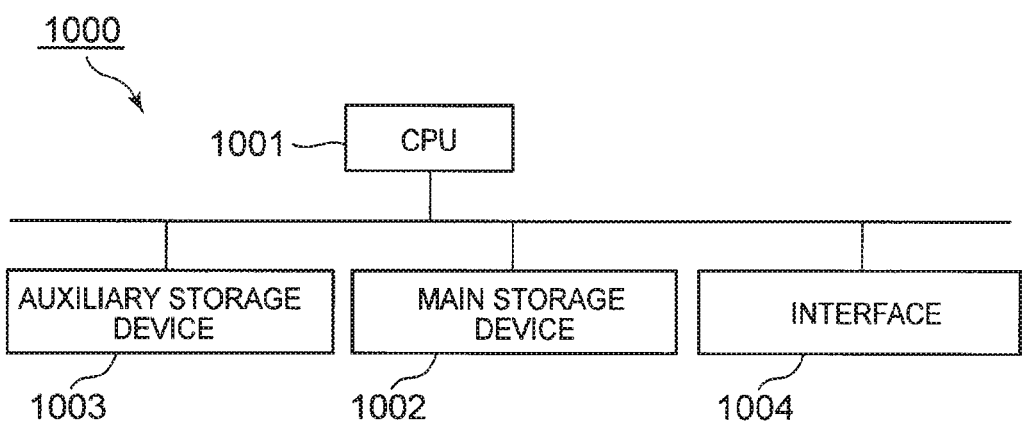
FIG. 23 is a schematic block diagram showing the configuration of a computer according to at least one exemplary embodiment.

FIG. 23 is a schematic block diagram showing the configuration of a computer according to at least one exemplary embodiment. A computer 1000 includes a CPU 1001, a main storage device 1002, an auxiliary storage device 1003, and an interface 1004.

The above hierarchical latent variable model estimation device and the sales prediction device are installed in the computer 1000. In addition, the computer 1000 in which the hierarchical latent variable model estimation device is installed may differ from the computer 1000 in which the sales prediction device is installed. Then, the operations of the respective processing units described above are stored in the auxiliary storage device 1003 in the form of a program (a hierarchical latent variable model estimation program or a sales prediction program). The CPU 1001 reads out the program from the auxiliary storage device 1003, develops the program in the main storage device 1002, and executes the aforementioned processes according to the program.

In at least one exemplary embodiment, the auxiliary storage device 1003 is an example of a non-temporary tangible medium. Other examples of the non-temporary tangible medium include a magnetic disk, a magneto-optical disk, a CD-ROM, a DVD-ROM, a semiconductor memory, and the like connected via the interface 1004. Moreover, in the case where the program is distributed to the computer 1000 through a communication line, the computer 1000 having received the distribution may develop the program into the main storage device 1002 and execute the aforementioned processes.

The program may be intended to implement some of the aforementioned functions. Furthermore, the program may be one for implementing the aforementioned functions by a combination with other programs already stored in the auxiliary storage device 1003, namely a so-called differential file (differential program).

Some or all of the above exemplary embodiments may be described as in the following supplementary note, but not limited thereto.

(Supplementary Note 1) A computer-readable recording medium having recorded thereon a sales prediction assistance program for causing a computer to perform: a learning data input process of inputting learning data that is a plurality of combinations of a response variable indicating future sales and one or more explanatory variables which are information likely to affect the sales; a hierarchical latent structure setting process of setting a hierarchical latent structure that is a structure in which latent variables are represented by a tree structure and components representing probability models are located at nodes of a lowest level of the tree structure; a variational probability computation process of computing a variational probability of a path latent variable that is a latent variable included in a path linking a root node to a target node in the hierarchical latent structure, on the basis of the learning data input in the learning data input process and the components; a component optimization process of optimizing each of the components for the computed variational probability, on the basis of the learning data input in the learning data input process; a gating function optimization process of optimizing a gating function model that is a model for determining a branch direction according to the explanatory variable in a node of the hierarchical latent structure, on the basis of the variational probability of the latent variable in the node; a prediction data input process of inputting one or more explanatory variables as prediction data; an exposure pattern generation process of generating an exposure pattern which is an explanatory variable indicating the content of a CM scheduled to be performed during a period from predicted time to future prediction target time; a component determination process of determining the component used for predicting the sales among the components optimized in the component optimization process, on the basis of the gating functions optimized in the gating function optimization process and of the prediction data and the exposure pattern; and a sales prediction process of predicting the sales on the basis of the component determined in the component determination process and of the prediction data and the exposure pattern.

Although the present invention has been described with reference to the exemplary embodiments and examples hereinabove, the present invention is not limited thereto. A variety of changes, which can be understood by those skilled in the art, may be made in the configuration and details of the present invention within the scope thereof.

This application claims priority to U.S. provisional application No. 62/024,121 filed on Jul. 14, 2014, and the entire disclosure thereof is hereby incorporated herein by reference.

REFERENCE SIGNS LIST

10 Sales prediction assistance system
100 Hierarchical latent variable model estimation device
300 Learning database
500 Model database
700, 800 Sales prediction device
701 Data input device
702 Model acquisition unit
703 Component determination unit
704 Sales prediction unit 801 Exposure pattern generation unit
802 Sales evaluation unit

The invention claimed is:

1. A message planning assistance system comprising:
hardware including a processor;
a prediction data input unit implemented at least by the hardware and which inputs prediction data that is one or more explanatory variables that are information likely to affect sales in future;
an exposure pattern generation unit implemented at least by the hardware and which generates an exposure pattern which is an explanatory variable indicating content of a message scheduled to be performed during a period from predicted time to future prediction target time;
a component determination unit implemented at least by the hardware and which determines a component used for predicting the sales, based on a hierarchical latent structure that is a structure in which latent variables are represented by a tree structure and components representing probability models are located at nodes of a lowest level of the tree structure, based on gating functions for determining a branch direction in the nodes of the hierarchical latent structure, and based on the prediction data and the exposure pattern; and
a sales prediction unit implemented at least by the hardware and which predicts the sales based on the component determined by the component determination unit and based on the prediction data and the exposure pattern,
wherein the exposure pattern generation unit generates the exposure pattern based on at least one type of information of budget, price list, and attribute data.

2. The message planning assistance system according to claim 1, wherein the component determination unit outputs an explanatory variable likely to affect the sales more heavily.

3. The message planning assistance system according to claim 2, wherein the exposure pattern generation unit generates an exposure pattern in which a heavy emphasis is placed on the output explanatory variable.

4. The message planning assistance system according to claim 3, further comprising a sales evaluation unit implemented at least by the hardware and which evaluates the predicted sales, wherein the sales evaluation unit instructs the exposure pattern generation unit to generate a new exposure pattern until a prediction process by the sales prediction unit or an increment of the predicted sales satisfies a predetermined condition.

5. The message planning assistance system according to claim 4, wherein the component determination unit outputs an explanatory variable likely to affect the sales more heavily together with a hierarchical latent structure.

6. The message planning assistance system according to claim 2, wherein the component determination unit outputs an explanatory variable likely to affect the sales more heavily together with a hierarchical latent structure.

7. The message planning assistance system according to claim 6, wherein the component determination unit outputs a branch condition indicated by the gating function of the hierarchical latent structure.

8. The message planning assistance system according to claim 3, wherein the component determination unit outputs an explanatory variable likely to affect the sales more heavily together with a hierarchical latent structure.

9. The message planning assistance system according to claim 1, further comprising a model acquisition unit, implemented at least by the hardware and which visualizes and displays the probability model showing the hierarchical latent structure on a display device,
wherein the model acquisition unit displays the components or identification information of the components in a root node of the tree structure and displays condition or identification information of the condition indicated by the gating function corresponding to a higher node of the tree structure.

10. A message planning assistance method comprising:
inputting prediction data that is one or more explanatory variables that are information likely to affect sales in future;
generating an exposure pattern which is an explanatory variable indicating content of a message scheduled to be performed during a period from predicted time to future prediction target time;
determining a component used for predicting the sales, based on a hierarchical latent structure that is a structure in which latent variables are represented by a tree structure and components representing probability models are located at nodes of a lowest level of the tree structure, based on gating functions for determining a branch direction in the nodes of the hierarchical latent structure, and based on the prediction data and the exposure pattern; and
predicting the sales based on the determined component and of the prediction data and the exposure pattern,
wherein the generating an exposure pattern comprises generating the exposure pattern based on at least one type of information of budget, price list, and attribute data.

* * * * *